(12) United States Patent
Sawada

(10) Patent No.: US 11,643,047 B2
(45) Date of Patent: *May 9, 2023

(54) IMAGE DISPLAY DEVICE, IMAGE DISPLAY SYSTEM, IMAGE DISPLAY METHOD AND PROGRAM

(71) Applicant: FUJITSU TEN LIMITED, Kobe (JP)

(72) Inventor: Yasuyoshi Sawada, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 371 days.

This patent is subject to a terminal disclaimer.

(21) Appl. No.: 17/089,767

(22) Filed: Nov. 5, 2020

(65) Prior Publication Data
US 2021/0053529 A1 Feb. 25, 2021

Related U.S. Application Data

(63) Continuation of application No. 14/915,922, filed as application No. PCT/JP2014/074091 on Sep. 11, 2014, now Pat. No. 10,857,974.

(30) Foreign Application Priority Data

Oct. 11, 2013 (JP) ................................. 2013-214014

(51) Int. Cl.
*B60R 25/102* (2013.01)
*B60R 25/31* (2013.01)
(Continued)

(52) U.S. Cl.
CPC .......... *B60R 25/102* (2013.01); *B60R 25/305* (2013.01); *B60R 25/31* (2013.01);
(Continued)

(58) Field of Classification Search
CPC ..... B60R 25/102; B60R 25/305; B60R 25/31; G06V 20/52; G06T 3/4038; H04N 7/181
(Continued)

(56) References Cited

U.S. PATENT DOCUMENTS 7,307,655 B1 12/2007 Okamoto et al.
8,452,079 B2 5/2013 Tomita
(Continued)

FOREIGN PATENT DOCUMENTS

JP H07-200875 A 8/1995
JP 2011-066763 A 3/2011
(Continued)

OTHER PUBLICATIONS

Oct. 21, 2014 Search Report issued in International Patent Application No. PCT/JP2014/074091.
(Continued)

*Primary Examiner* — Thai Q Tran
*Assistant Examiner* — Nienru Yang
(74) *Attorney, Agent, or Firm* — Oliff PLC

(57) ABSTRACT

A plurality of images of an imaging subject are captured by using a plurality of cameras. The plurality of images are synthesized to generate a synthesized image viewing the imaging subject from a virtual perspective. The synthesized image is displayed on a screen. When a user operation for changing the position of the virtual perspective is detected, the position of the virtual perspective in the synthesized image is changed.

8 Claims, 33 Drawing Sheets

(51) Int. Cl.
    *B60R 25/30*     (2013.01)
    *H04N 7/18*     (2006.01)
    *G06T 3/40*     (2006.01)
    *G06V 20/52*     (2022.01)

(52) U.S. Cl.
    CPC ............ *G06T 3/4038* (2013.01); *G06V 20/52* (2022.01); *H04N 7/181* (2013.01)

(58) Field of Classification Search
    USPC .......................................................... 348/148
    See application file for complete search history.

(56) References Cited

U.S. PATENT DOCUMENTS

| | | | |
|---|---|---|---|
| 10,857,974 B2 * | 12/2020 | Sawada ................. | B60R 25/102 |
| 2002/0039136 A1 | 4/2002 | Okamoto et al. | |
| 2004/0249564 A1 | 12/2004 | Iwakiri et al. | |
| 2007/0003108 A1 | 1/2007 | Chinomi et al. | |
| 2008/0204556 A1 | 8/2008 | de Miranda et al. | |
| 2009/0225002 A1 | 9/2009 | Imai et al. | |
| 2009/0259969 A1 | 10/2009 | Pallakoff | |
| 2011/0066963 A1 | 3/2011 | Schrag et al. | |
| 2011/0249030 A1 | 10/2011 | Hirose et al. | |
| 2011/0285848 A1 * | 11/2011 | Han .......................... | B60R 1/00 348/148 |
| 2012/0069188 A1 | 3/2012 | Ohno et al. | |
| 2012/0092457 A1 * | 4/2012 | Sugino ................. | H04N 13/286 348/46 |
| 2012/0140073 A1 | 6/2012 | Ohta et al. | |
| 2012/0287282 A1 | 11/2012 | Kinoshita et al. | |
| 2012/0327238 A1 | 12/2012 | Satoh | |
| 2013/0067397 A1 | 3/2013 | Kirschner et al. | |

FOREIGN PATENT DOCUMENTS

| | | |
|---|---|---|
| JP | 2012-121384 A | 6/2012 |
| JP | 2012-124610 A | 6/2012 |
| JP | 2013-038781 A | 2/2013 |
| JP | 2013-191969 A | 9/2013 |
| WO | 2011/064895 A1 | 6/2011 |

OTHER PUBLICATIONS

Apr. 21, 2016 International Preliminary Report on Patentability issued in International Patent Application No. PCT/JP2014/074091.
Oct. 19, 2017 Office Action issued in U.S. Appl. No. 14/915,922.
Apr. 10, 2018 Office Action issued in U.S. Appl. No. 14/915,922.
Oct. 4, 2018 Office Action issued in U.S. Appl. No. 14/915,922.
Feb. 25, 2019 Office Action issued in U.S. Appl. No. 14/915,922.
Jun. 25, 2019 Office Action issued in U.S. Appl. No. 14/915,922.
Nov. 14, 2019 Office Action Issued in U.S. Appl. No. 14/915,922.
Apr. 1, 2020 Office Action Issued in U.S. Appl. No. 14/915,922.
Aug. 5, 2020 Notice of Allowance Issued in U.S. Appl. No. 14/915,922.
Dec. 31, 2010, "AutoCAD 2008 Mechanical design Practice Tutorial 2010," pp. 165-166, with partial translation.

* cited by examiner

FIG. 7
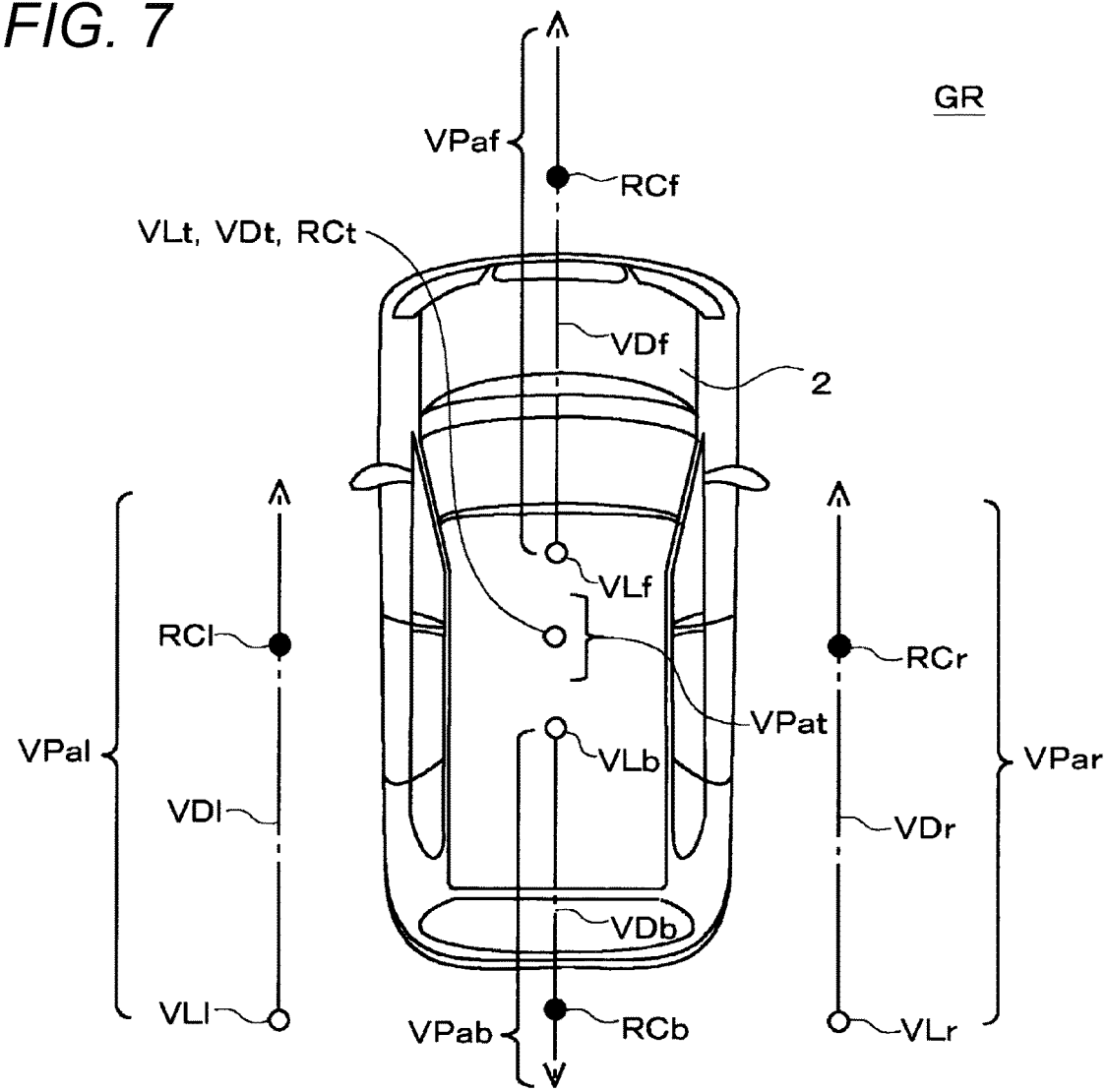
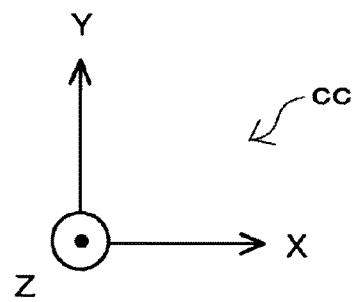

FIG. 9
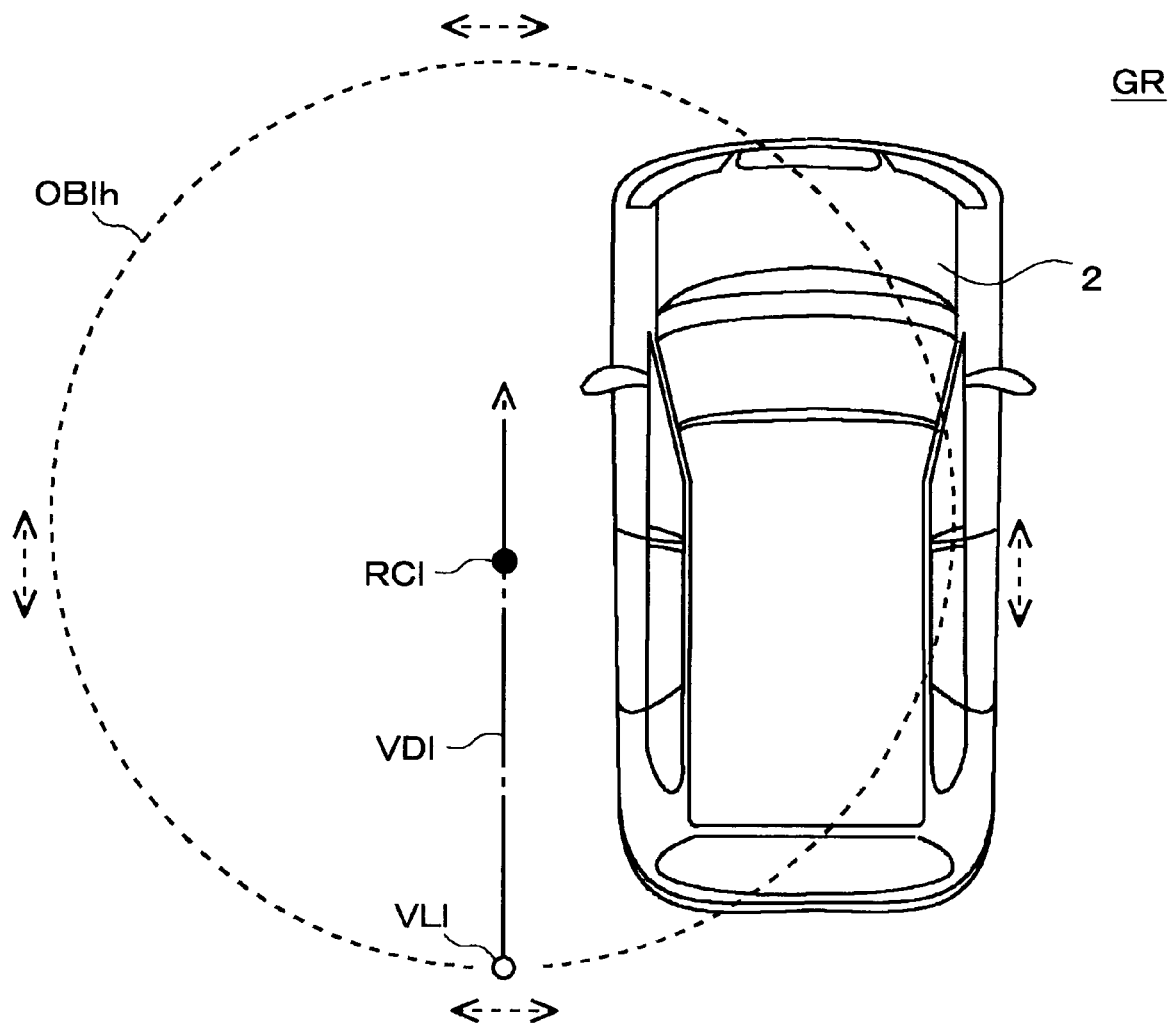
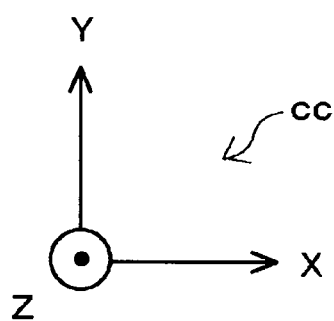

FIG. 10
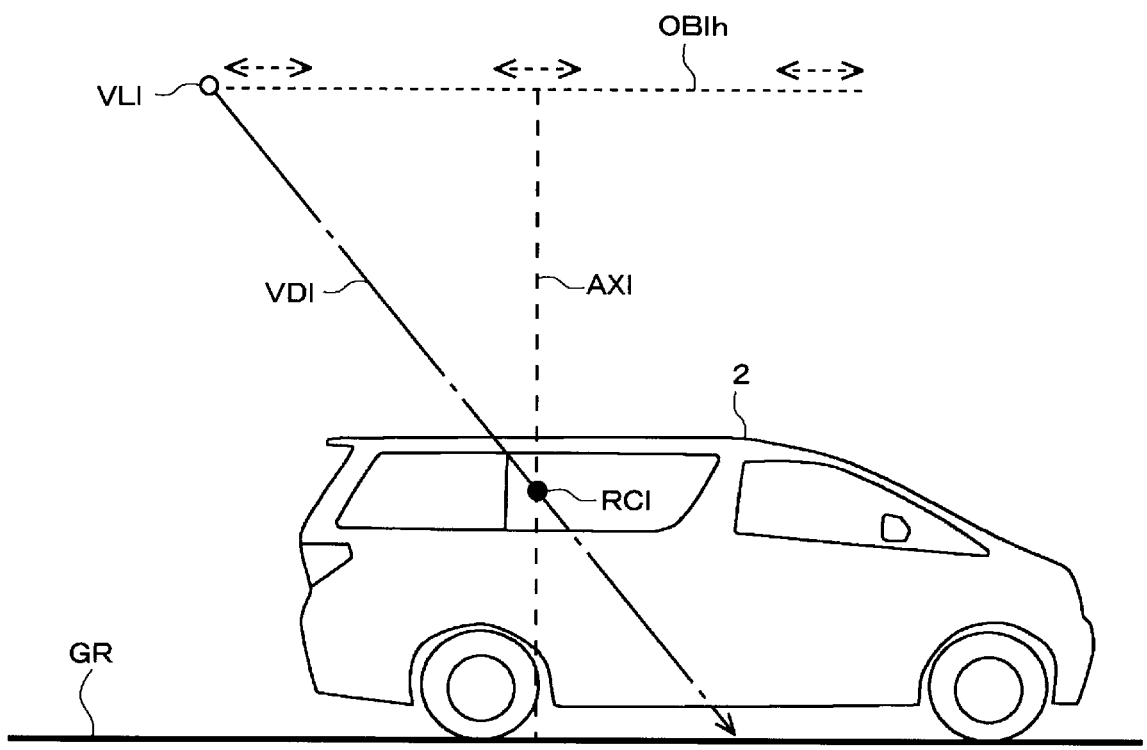
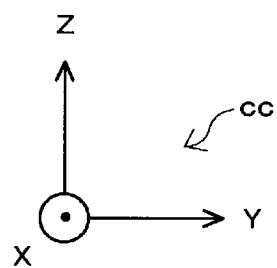

FIG. 28
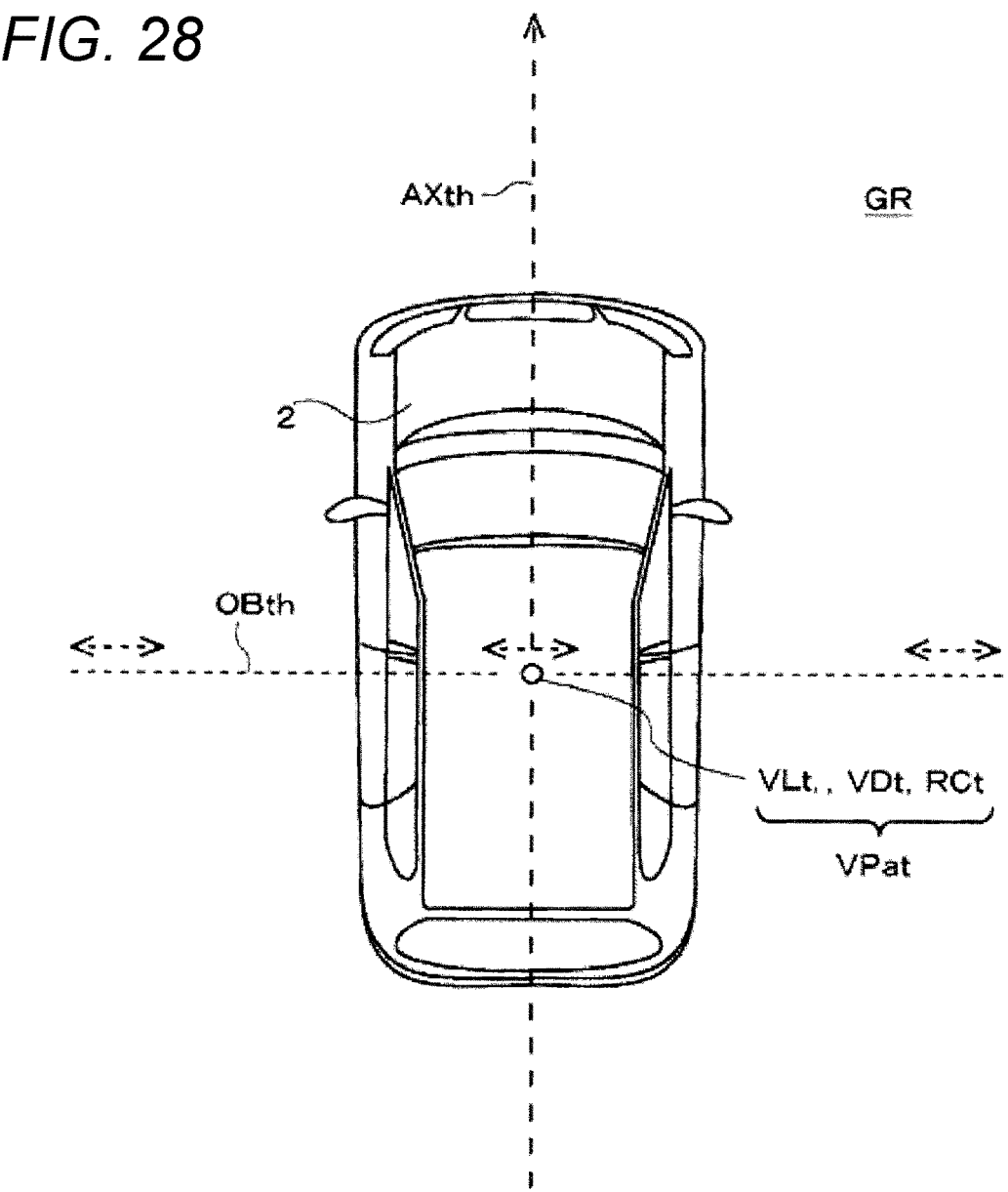
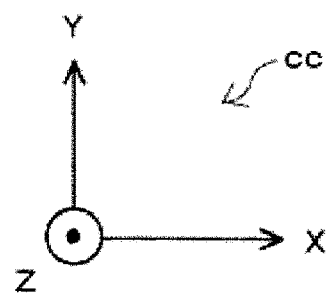

FIG. 30
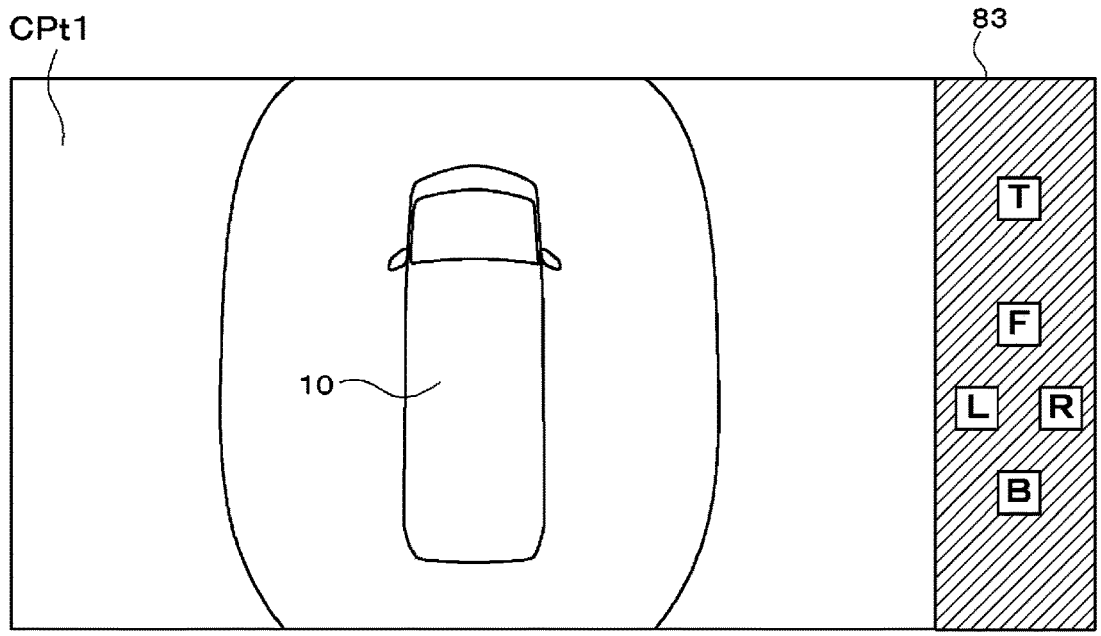
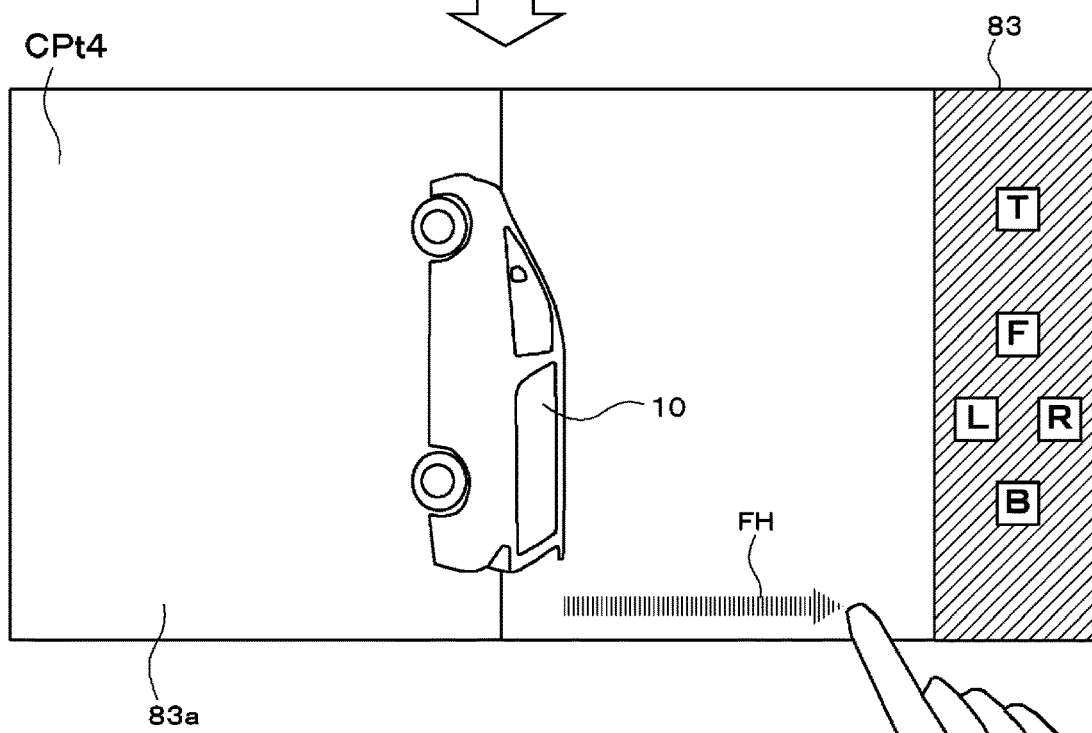

IMAGE DISPLAY DEVICE, IMAGE DISPLAY SYSTEM, IMAGE DISPLAY METHOD AND PROGRAM

This is a Continuation of application Ser. No. 14/915,922 filed Mar. 2, 2016, which is a national stage entry of PCT/JP2014/074091 filed Sep. 11, 2014, which claims priority to Japanese Patent Application No. JP 2013-214014 filed Oct. 11, 2013. The content and disclosure of the prior applications are hereby incorporated by reference in entirety.

TECHNICAL FIELD

The present invention relates to a technology of displaying an image indicative of surroundings of a vehicle.

BACKGROUND

A technology of synthesizing images obtained by capturing surroundings of a vehicle such as an automobile and displaying a synthesized image viewing the surroundings of the vehicle from a virtual perspective has been known. By the technology, a user (representatively, a driver) can check the surroundings of the vehicle with sitting in the vehicle.

A technology of transmitting the image to a portable terminal carried by the user has been also suggested (for example, refer to Patent Literature 1). The user can recognize a state or theft possibility of the vehicle by visibly recognizing the image, even though the user is at a place remote from the vehicle.

CITATION LIST

Patent Literature

Patent Literature 1: JP-A-2012-121384

SUMMARY OF INVENTION

Technical Problem

According to the suggested technology, however, since the perspective for viewing the surroundings of the vehicle is limited, the user cannot always visibly recognize the surrounding image from a desired angle. For this reason, for example, even when the user checks, on the portable terminal, an image showing that a suspicious person is approaching in the vicinity of the vehicle, it is not clearly determined who the suspicious person is and what the suspicious person is doing, so that the user's concern may be instead increased.

It is therefore an object of the present invention to change a virtual perspective to a user's desired perspective when displaying an image indicative of surroundings of a vehicle from the virtual perspective.

Solution to Problem

In order to achieve the above object, a first aspect to be taken by the present invention is an image display device including:

an acquisition unit configured to acquire a plurality of images obtained by capturing an imaging subject by using a plurality of cameras, a generation unit configured to synthesize the plurality of images and to generate a synthesized image viewing the imaging subject from a virtual perspective, a display control unit configured to display the synthesized image on a screen, and a detection unit configured to detect a user operation of changing a position of the virtual perspective of the synthesized image displayed on the screen, wherein the generation unit is configured to change the position of the virtual perspective of the synthesized image on the basis of the user operation.

According to the above configuration, since the position of the virtual perspective of the synthesized image is changed on the basis of the user operation, it is possible to easily display the imaging subject from a user's desired perspective.

In the image display device, the synthesized image may be configured by an image viewing a reference point set at a specific position of the imaging subject from the position of the virtual perspective, irrespective of the position of the virtual perspective.

According to the above configuration, it is possible to provide the synthesized image enabling a user to feel as if the user were moving while seeing the imaging subject.

In the image display device, the plurality of cameras may be mounted on a vehicle. In this case, the generation unit may be configured to change the position of the virtual perspective on the basis of a world coordinate system in which the reference point is set as an origin with respect to the vehicle and a perspective coordinate system in which the reference point is set as an origin with respect to the virtual perspective.

According to the above configuration, it is possible to display the imaging subject from diverse directions and positions.

The image display device may be configured so that a position of the reference point can be set by a user.

According to the above configuration, it is possible to display the imaging subject at a user's desired angle.

In the image display device, the generation unit may change the position of the virtual perspective about a vertical axis of the world coordinate system when the user operation is an operation indicative of a horizontal direction on the screen.

According to the above configuration, it is possible to change the position of the virtual perspective about the vertical axis of the world coordinate system by a simple operation.

In the image display device, the generation unit may change the position of the virtual perspective about a horizontal axis of the perspective coordinate system when the user operation is an operation indicative of a vertical direction on the screen.

According to the above configuration, it is possible to change the position of the virtual perspective about the horizontal axis of the perspective coordinate system by a simple operation.

In the image display device, the generation unit may change the position of the virtual perspective within a range above a ground contact surface of the imaging subject when the position of the virtual perspective is changed about the horizontal axis of the perspective coordinate system.

According to the above configuration, it is possible to set an appropriate perspective position.

In the image display device, the plurality of cameras may be mounted on a vehicle. In this case, when a user operation indicative of a horizontal direction on the screen is performed with the reference point being viewed from the virtual perspective located immediately above the vehicle, the generation unit may change the position of the virtual perspective about a longitudinal axis of the vehicle.

According to the above configuration, since the position of the virtual perspective is changed from a position immediately above the vehicle to a lateral side, it is possible to display the imaging subject while changing a viewing angle without uncomfortable feeling.

In order to achieve the above object, a second aspect to be taken by the present invention is an image display system including:

an image acquisition device, and an image display device capable of performing communication with the image acquisition device, wherein the image acquisition device includes:

an acquisition unit configured to acquire a plurality of images obtained by capturing an imaging subject by using a plurality of cameras, a request reception unit configured to receive from the image display device a request signal for requesting transmission of the plurality of images, and an image transmission unit configured to transmit the plurality of images on the basis of the request signal, wherein the image display device includes:

a request transmission unit configured to transmit to the image acquisition device the request signal for requesting transmission of the plurality of images, an image reception unit configured to receive the plurality of images from the image acquisition device, a generation unit configured to synthesize the plurality of images and to generate a synthesized image viewing the imaging subject from a virtual perspective, a display control unit configured to display the synthesized image on a screen, and a detection unit configured to detect a user operation of changing a position of the virtual perspective of the synthesized image displayed on the screen, and wherein the generation unit is configured to change the virtual perspective of the synthesized image on the basis of the user operation.

According to the above configuration, since the position of the virtual perspective of the synthesized image is changed on the basis of the user operation, it is possible to easily display the imaging subject from a user's desired perspective.

In the image display system, the image acquisition device may be mounted on a vehicle. In this case, the imaging subject may be surroundings of the vehicle. Also, the image display system may have a security device configured to detect a previous phenomenon leading to theft of the vehicle. The security device may have a monitoring unit configured to detect the previous phenomenon and a notification unit configured to notify the image display device of detection of the previous phenomenon.

According to the above configuration, even though a user of the image display device is at a place remote from the vehicle, the user can recognize occurrence of the previous phenomenon leading to the theft of the vehicle and can rapidly check the surroundings of the vehicle through the screen.

In order to achieve the above object, a third aspect to be taken by the present invention is an image display method including:

(a) a step of acquiring a plurality of images obtained by capturing an imaging subject by using a plurality of cameras;

(b) a step of synthesizing the plurality of images and generating a synthesized image viewing the imaging subject from a virtual perspective;

(c) a step of displaying the synthesized image on a screen; and (d) a step of detecting a user operation of changing a position of the virtual perspective of the synthesized image displayed on the screen, wherein in step (b), the position of the virtual perspective of the synthesized image is changed on the basis of the user operation.

According to the above configuration, since the position of the virtual perspective of the synthesized image is changed on the basis of the user operation, it is possible to easily display the imaging subject from a user's desired perspective.

In order to achieve the above object, a fourth aspect to be taken by the present invention is a program configured to be executable by a computer included in an image display device configured to display an image. The program is configured to enable the computer to execute:

(a) a step of acquiring a plurality of images obtained by capturing an imaging subject by using a plurality of cameras, (b) a step of synthesizing the plurality of images and generating a synthesized image viewing the imaging subject from a virtual perspective, (c) a step of displaying the synthesized image on a screen, and (d) a step of detecting a user operation of changing a position of the virtual perspective of the synthesized image displayed on the screen, wherein in step (b), the position of the virtual perspective of the synthesized image is changed on the basis of the user operation.

According to the above configuration, since the position of the virtual perspective of the synthesized image is changed on the basis of the user operation, it is possible to easily display the imaging subject from a user's desired perspective.

BRIEF DESCRIPTION OF DRAWINGS

FIG. 7 depicts positions of virtual perspectives in the image display system of FIG. 1.

FIG. 9 depicts movement of the virtual perspective in the image display system of FIG. 1.

FIG. 10 depicts movement of the virtual perspective in the image display system of FIG. 1.

FIG. 28 depicts movement of the virtual perspective in the image display system of FIG. 27.

FIG. 30 depicts an example of the display image in the image display system of FIG. 27.

DESCRIPTION OF EMBODIMENTS

Hereinafter, illustrative embodiments of the present invention will be described with reference to the drawings.

1. First Illustrative Embodiment 1-1. Outline

Figure 1:
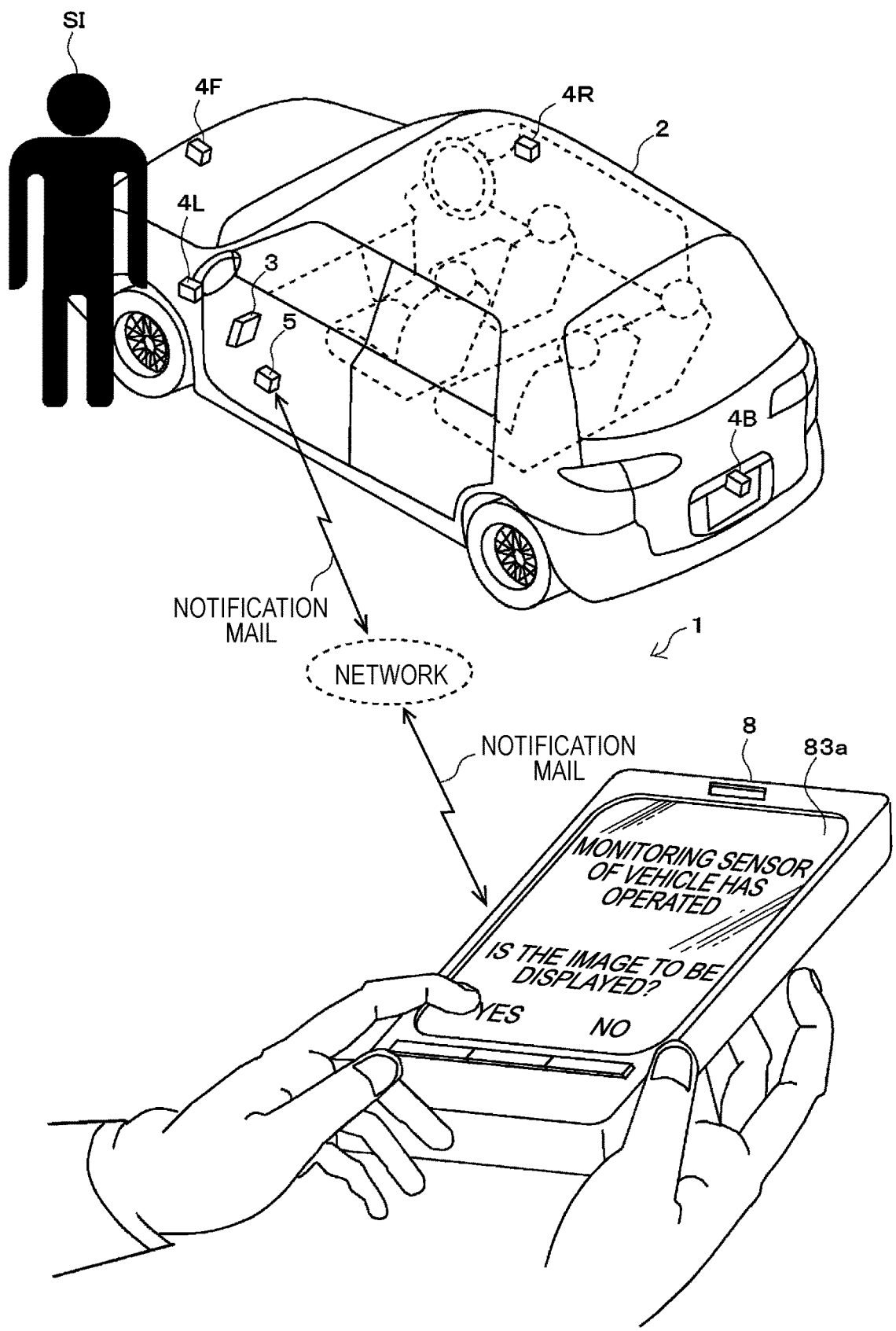
FIG. 1 depicts an outline of an image display system according to a first illustrative embodiment.

FIG. 1 depicts an outline of an image display system 1 according to an illustrative embodiment. The image display system 1 has an image acquisition device 3 and cameras 4(4F, 4B, 4L, 4R) mounted on a vehicle 2. The image display system 1 is a system for displaying surrounding images of the vehicle 2, which are to be acquired from the cameras 4(4F, 4B, 4L, 4R) by the image acquisition device 3, on a portable terminal 8. The portable terminal 8 is carried by a user remote from the vehicle 2.

In the system, the vehicle 2 is mounted with a security device 5 having a monitoring sensor. The monitoring sensor operates when a suspicious person is excessively approaching the vehicle 2 or does physical harm to the vehicle 2, and the security device 5 notifies the user that the monitoring sensor has operated. The user having received a notification from the security device 5 requests the image acquisition device 3 to transmit an image, and the surrounding image of the vehicle 2 is displayed on the portable terminal 8. At this time, the user freely changes a range within which the image is displayed, and refers to a surrounding situation of the vehicle 2 at a desired angle.

Figure 2:
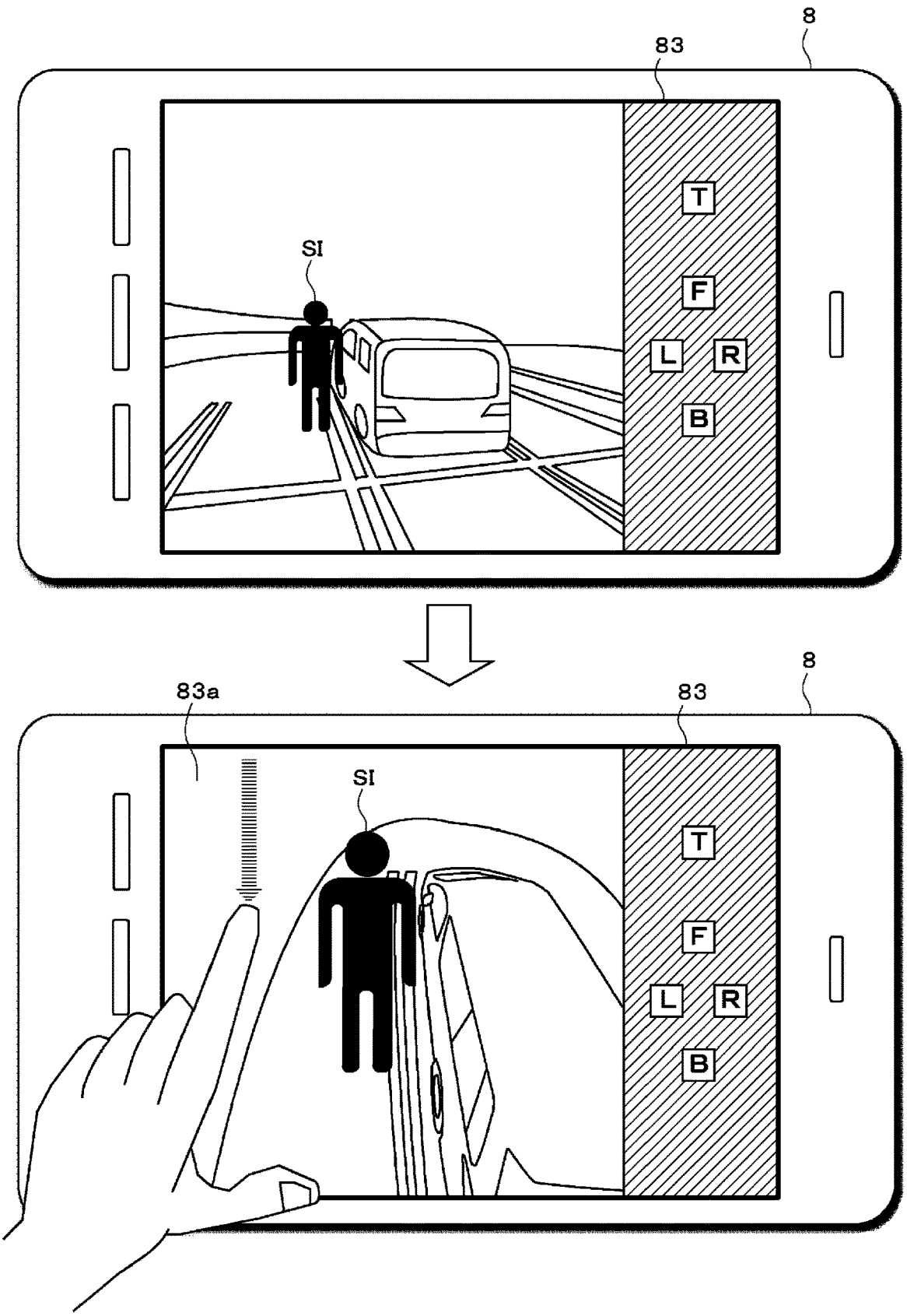
FIG. 2 depicts a portable terminal provided for the image display system of FIG. 1.

FIG. 2 depicts an example of the portable terminal 8 having a display 83 configured to display the surrounding image of the vehicle 2. The user can change a display range of the image and check a concerned part in detail by operating a touch panel 83a of the display 83. The user refers to the surrounding image of the vehicle 2, and can remotely operate an alarm of the vehicle 2 or notify a security company, as required. By using the image display system 1, even when the user is at a place remote from the vehicle 2, the user can safely keep the vehicle 2 all the time.

1-2. Configuration

Subsequently, the respective devices mounted on the vehicle 2 and configuring the image display system 1 are described with reference to FIG. 3. The vehicle 2 has the image acquisition device 3, the cameras 4, the security device 5, and an alarm unit 6.

The image acquisition device 3 is an electronic control device configured to receive image data from the cameras 4 mounted on the vehicle and to transmit the received image data to the portable terminal 8. The image acquisition device 3 has a control unit 31, a communication unit 32 and a storage unit 33.

The control unit 31 is a microcomputer having a CPU, a RAM and a ROM. The control unit 31 is connected in communication with the other configurations of the image acquisition device 3, and is configured to control overall operations of the device. The control unit 31 has a request reception unit 31a, a camera control unit 31b, an image acquisition unit 31c, an image transmission unit 31d and an antitheft unit 31e.

The request reception unit 31a is configured to receive a request signal for requesting operations and capturing start of the cameras 4 from the user having the portable terminal 8.

When the request reception unit 31a receives the request signal for capturing start from the user, the camera control unit 31b transmits an operation signal to the cameras 4 to cause the cameras 4 to start the capturing.

The image acquisition unit 31c is configured to acquire image data transmitted from the cameras 4 and to convert the acquired image data into a format that can be processed in the control unit 31.

The image transmission unit 31d is configured to transmit the image data, which is acquired from the cameras 4 by the image acquisition unit 31c, to the portable terminal 8 through the communication unit 32.

The antitheft unit 31e is configured to transmit an operation signal to the alarm unit 6 to cause the alarm unit 6 to issue an alarm. Thereby, the vehicle 2 is prevented from being thieved. In the meantime, the antitheft unit 31e may also be configured to cause the alarm unit 6 to issue an alarm and to control an engine control device (not shown) so that an engine is not operated. Also, the antitheft unit 31e may be configured to notify a security company through the communication unit 32. That is, the antitheft unit 31*e* may be configured to prevent the vehicle 2 from being thieved by using a device provided for the vehicle 2.

The communication unit 32 has a communication function using wireless communication, and is configured to perform information communication with the portable terminal 8 through a network 7. As the information communication technology to be used, WiMAX (Worldwide Interoperability for Microwave Access), LTE (Long Term Evolution) or the like may be exemplified.

The storage unit 33 is a memory configured to store therein data. For example, a non-volatile storage medium such as an EEPROM (Electrical Erasable Programmable Read-Only memory), a flash memory, a hard disk drive having a magnetic disk and the like may be cited. Also, the storage unit 33 has a program 33*a*.

The program 33*a* is firmware that is read out by the control unit 31 and is executed so as to control the image acquisition device 3 by the control unit 31.

In the below, the cameras 4 are described. The cameras 4 include a front camera 4F, a rear camera 4B, a left side camera 4L and a right side camera 4R. The cameras 4F, 4B, 4L, 4R have a lens and an imaging element, respectively, and are disposed at different positions of the vehicle 2.

Figure 4:
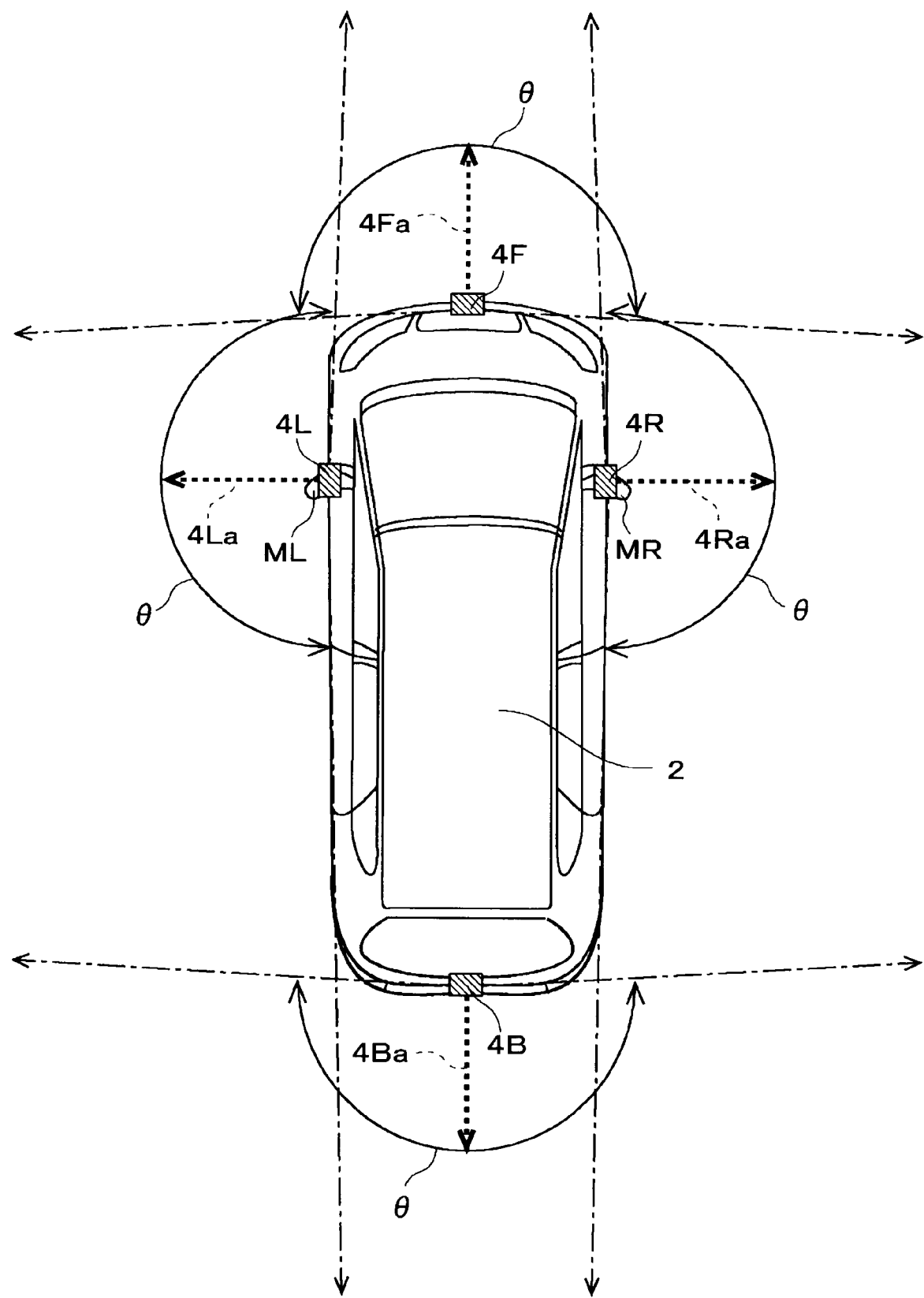
FIG. 4 depicts arrangement of cameras provided for the image display system of FIG. 1.

FIG. 4 depicts positions at which the cameras 4 (4F, 4B, 4L, 4R) are disposed at the vehicle 2 and directions in which optical axes of the respective cameras face. The front camera 4F is provided at a front end portion of the vehicle 2, and an optical axis 4Fa thereof is made to face towards a straight-ahead direction of the vehicle 2. The rear camera 4B is provided at a rear end portion of the vehicle 2, and an optical axis 4Ba thereof is made to face towards an opposite direction to the straight-ahead direction of the vehicle 2, i.e., a backward direction. The left side camera 4L is provided at a left side-view mirror ML, and an optical axis 4La thereof is made to face towards a left direction of the vehicle 2 (a direction orthogonal to the straight-ahead direction). The right side camera 4R is provided at a right side-view mirror MR, and an optical axis 4Ra thereof is made to face towards a right direction of the vehicle 2 (a direction orthogonal to the straight-ahead direction).

The respective cameras 4F, 4B, 4L, 4R are configured to capture the surroundings of the vehicle 2 in different directions and to electronically acquire captured images. The lens of the camera 4 has a focal distance shorter than a standard lens and a 180 degree or greater angle of view 8. For this reason, it is possible to capture the entire surroundings of the vehicle 2 by using the four cameras 4.

Figure 3:
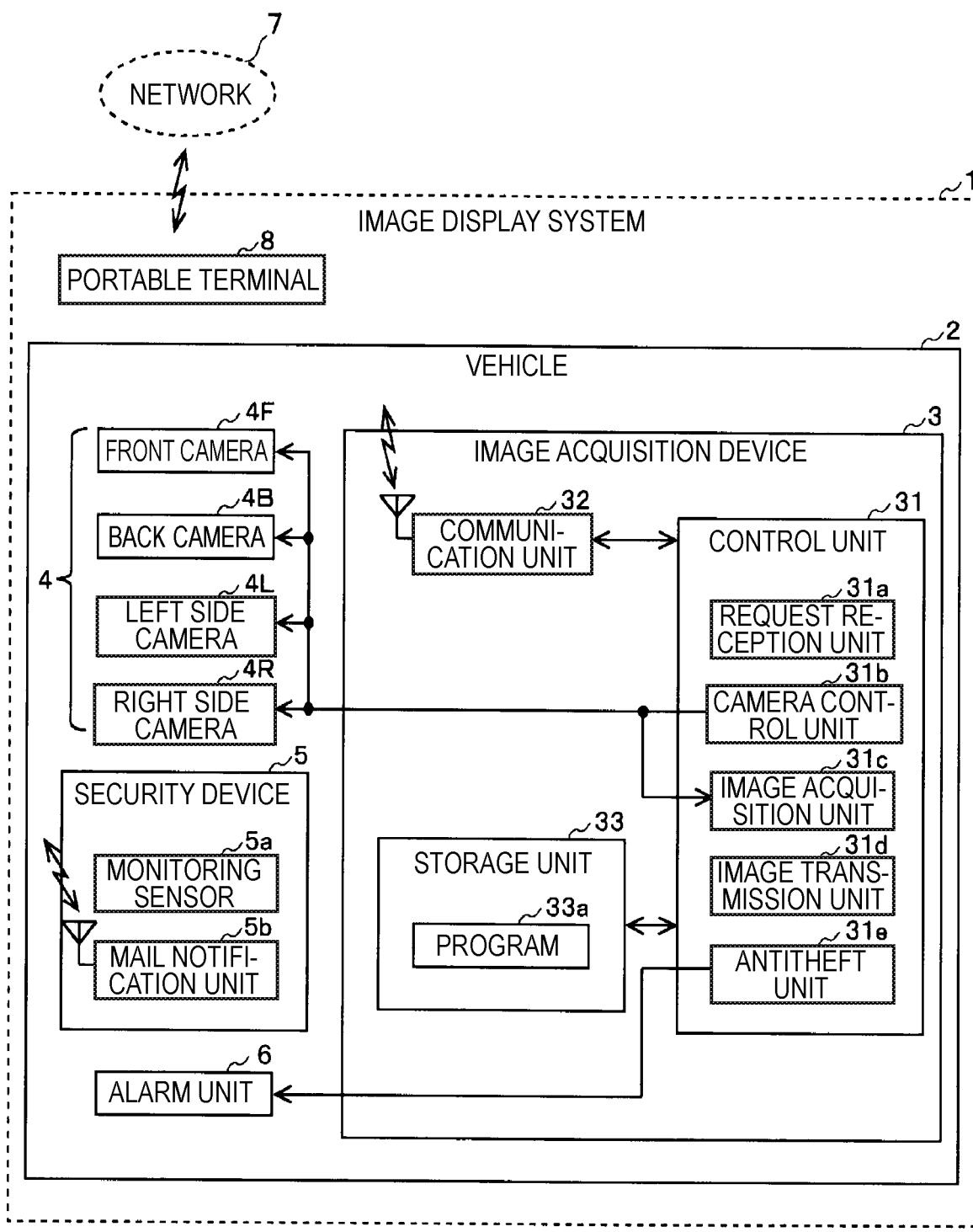
FIG. 3 is a block diagram depicting a configuration of the image display system of FIG. 1.

As shown in FIG. 3, the security device 5 is a device configured to detect a previous phenomenon leading to theft of the vehicle 2 or an article in the vehicle 2, and to notify the portable terminal 8 carried by the user of the vehicle 2 that theft concern has occurred, through an electronic mail. The security device 5 has a monitoring sensor 5*a* and a mail notification unit 5*b*.

The monitoring sensor 5*a* is a sensor configured to detect a previous phenomenon leading to theft of the vehicle 2 or an article in the vehicle 2. For example, a vibration sensor configured to detect vibrations generated in the vehicle 2, a glass breaking sensor configured to detect breaking of a glass of the vehicle 2, an inclination sensor configured to detect inclination of the vehicle 2 caused by a jack or a crane, an invasion sensor configured to detect an invader into the vehicle 2, and the like may be cited.

When the monitoring sensor 5*a* detects the previous phenomenon leading to the theft, the mail notification unit 5*b* notifies the user that the theft concern has occurred. Specifically, the mail notification unit 5*b* is configured to generate an electronic mail having contents that the theft concern has occurred and to transmit the electronic mail to the portable terminal 8 carried by the user. Rather than text information using the electronic mail, the notification may be made by voice information. In this case, the portable terminal 8 may be configured to read the voice information by speech. When the security device 5 has a plurality of monitoring sensors, the mail notification unit 5*b* is preferably configured to include information, which indicates that which monitoring sensor has detected the previous phenomenon leading to the theft, into the electronic mail. This is to enable the user to easily recognize the situation of the vehicle 2.

The alarm unit 6 is a device configured to make a voice to the surroundings for warning. The alarm unit 6 may be a speaker or horn mounted to the vehicle 2, for example. The alarm unit 6 may be a unit configured to emit light, such as a warning indicator mounted to the vehicle 2, in addition to the unit configured to make a voice. For example, the alarm unit 6 may be configured to call attention to the surroundings for warning.

Figure 5:
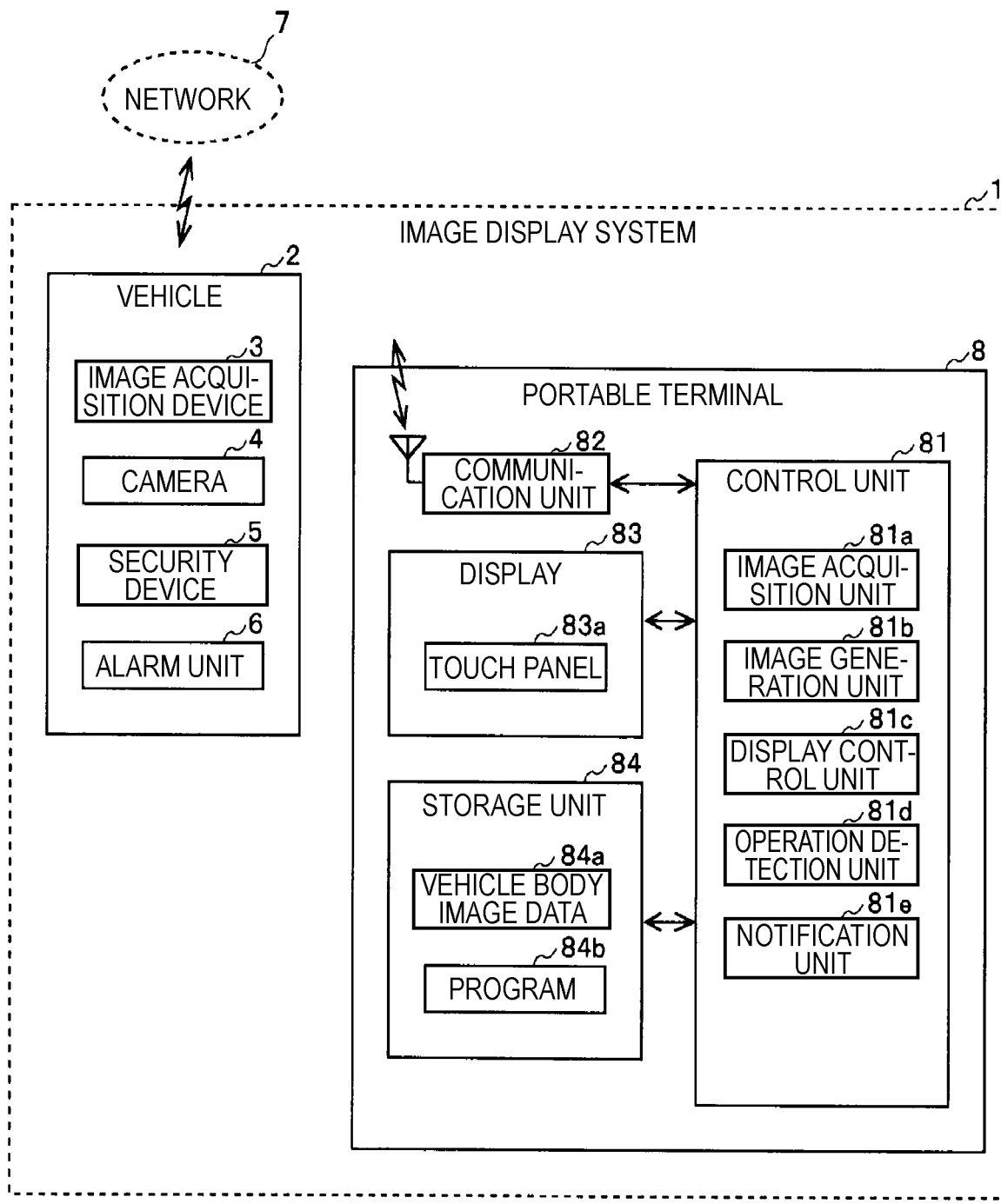
FIG. 5 is a block diagram depicting a configuration of the portable terminal of FIG. 2.

The portable terminal 8 is an information terminal carried by the user and having a function for displaying an image, a connection function to an information network, and the like. For example, the portable terminal 8 may be a portable phone or a smart phone. FIG. 5 depicts a configuration of the portable terminal 8. The portable terminal 8 has a control unit 81, a communication unit 82, the display 83 and a storage unit 84.

The control unit 81 is a microcomputer having a CPU, a RAM and a ROM. The control unit 81 is connected in communication with the other configurations of the portable terminal 8, and is configured to control overall operations of the portable terminal 8. The respective functions of the control unit 81 will be described later.

The communication unit 82 has a communication function using wireless communication, and is configured to perform information communication with the image acquisition device 3 and the security device 5 through the network 7. As the wireless communication technology to be used, WiMAX (Worldwide Interoperability for Microwave Access), LTE (Long Term Evolution) or the like may be exemplified.

The display 83 is configured to display a variety of information such as letters, figures and the like and to visually present the information to the user. The display 83 is a display device such as a liquid crystal monitor, a plasma display, an organic EL display or the like, for example. The display 83 has the touch panel 83*a*.

The touch panel 83*a* is configured to detect a user's touch on a button area displayed on the display 83 and to transmit the detected position information to the control unit 81.

The storage unit 84 is a memory configured to store therein data. For example, a non-volatile storage medium such as an EEPROM (Electrical Erasable Programmable Read-Only memory), a flash memory, a hard disk drive having a magnetic disk and the like may be cited. Also, the storage unit 84 has vehicle body image data 84*a* and a program 84*b* stored therein.

The vehicle body image data 84*a* is image data representing an outward appearance of the vehicle 2. The vehicle body image data 84*a* includes image data that is prepared while assuming a case where the vehicle 2 is viewed from all angles of the outside. The vehicle body image data 84*a* may be acquired from an external server through the network 7 after attaching the image acquisition device 3 to the vehicle 2, instead of storing the same in advance in the portable terminal 8. In this case, the vehicle body image data 84a coinciding with the outward appearance of the vehicle 2 having the image acquisition device 3 attached thereto can be acquired. The user may request the vehicle body image data 84a by transmitting a vehicle name or the like of the vehicle 2 to the external server from the portable terminal 8.

The program 84b is firmware that is read out by the control unit 81 and is executed so as to control the portable terminal 8 by the control unit 81.

The respective functions of the control unit 81 are described. The control unit 81 has an image acquisition unit 81a, an image generation unit 81b, a display control unit 81c and an operation detection unit 81d.

The image acquisition unit 81a is configured to acquire the image data transmitted from the image acquisition device 3 and to convert the acquired image data into a format that can be processed in the control unit 81. That is, the image acquisition unit 81a is configured to acquire the plurality of images obtained by capturing the imaging subject by using the plurality of cameras 4.

The image generation unit 81b is configured to synthesize the plurality of captured images acquired from the cameras 4 and to generate a surrounding image indicative of the surroundings of the vehicle 2 viewed from a virtual perspective. The virtual perspective is a perspective looking down the vehicle 2 from a position outside the vehicle 2. The image generation unit 81b is configured to superimpose a vehicle body image indicative of the vehicle 2 viewed from the virtual perspective on the surrounding image. A method of generating the surrounding image by the image generation unit 81b and a method of setting the virtual perspective will be described later.

The display control unit 81c is configured to display data such as an image, letters and the like on the display 83. The display control unit 81c is also configured to change an image and the like to be displayed on the display 83, based on a touch position input to the touch panel 83a.

The operation detection unit 81d is configured to detect a user operation on the touch panel 83a. Specifically, the operation detection unit 81d is configured to detect which direction a user's fingertip moves on the touch panel 83a after it touches the touch panel 83a, based on the touch position information transmitted from the touch panel 83a.

As the user operation on the touch panel 83a, a flick operation of contacting and sliding the fingertip on the touch panel 83a, a pinch-in operation of shortening an interval between the fingertip and the fingertip with the two fingertips being contacted to the touch panel 83a, and a pinch-out operation of widening an interval between the fingertip and the fingertip with the two fingertips being contacted to the touch panel 83a may be exemplified.

The notification unit 81e is configured to transmit a predetermined signal to a device outside the portable terminal 8 through the communication unit 82. As the signal to be transmitted by the notification unit 81e, a signal for requesting the image acquisition device to transmit the image data may be exemplified.

1-3. Generations of Surrounding Image and Synthesized Image

Figure 6:
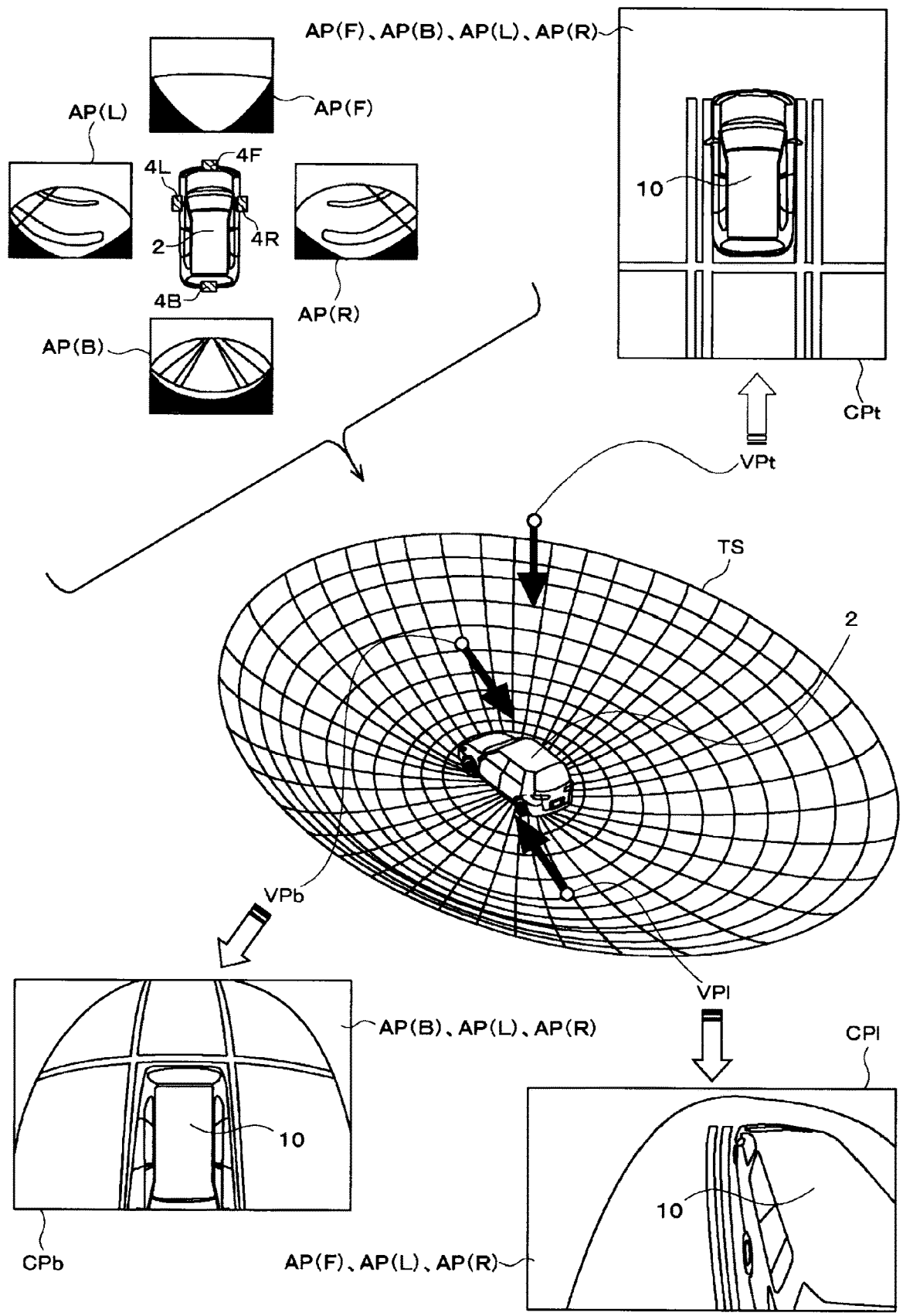
FIG. 6 depicts a method of generating surrounding images and a synthesized image in the image display system of FIG. 1.

In the below, a method by which the image generation unit 81b generates a surrounding image AP indicative of a surrounding area of the vehicle 2 and a synthesized image CP having the vehicle body image 10 superimposed on the surrounding image AP is described. FIG. 6 depicts a method by which the image generation unit 81b generates the surrounding image AP.

First, when the front camera 4F, the rear camera 4B, the left side camera 4L and the right side camera 4R capture the surroundings of the vehicle 2, respectively, four images AP(F), AP(B), AP(L), AP(R) indicative of the front, the rear, the left side and the right side of the vehicle 2 are acquired. The four images include the image data representing the entire surroundings of the vehicle 2.

The image generation unit 81b projects the data (values of respective pixels) included in the four images AP(F), AP(B), AP(L), AP(R) to a projection plane TS, which is a three-dimensional curved surface in a virtual three dimensional space. The projection plane TS has a substantially semi-spherical shape (a bowl shape), for example. A central part (a bottom part of the bowl) of the projection plane TS is defined as a position of the vehicle 2. Also, parts except for the central part of the projection plane TS are associated with any one of the images AP(F), AP(B), AP(L), AP(R), respectively.

The image generation unit 81b projects the surrounding images AP(F), AP(B), AP(L), AP(R) to the parts except for the central part of the projection plane TS. The image generation unit 81b projects the image AP(F) of the front camera 4F to a part of the projection plane TS, which corresponds to the front of the vehicle 2, and projects the image AP(B) of the rear camera 4B to a part of the projection plane TS, which corresponds to the rear of the vehicle 2. Also, the image generation unit 81b projects the image AP(L) of the left side camera 4L to a part of the projection plane TS, which corresponds to the left side of the vehicle 2, and projects the image AP(R) of the right side camera 4R to a part of the projection plane TS, which corresponds to the right side of the vehicle 2. Thereby, the surrounding image AP indicative of the entire surrounding areas of the vehicle 2 is generated.

Then, the image generation unit 81b sets a virtual perspective VP facing from any perspective position in the three-dimensional space towards any line of sight. Then, the image generation unit 81b cuts image data projected to an area of the projection plane TS, which is included in a view angle as seen from the set virtual perspective VP. By the cut image data, the surrounding image AP indicative of the surrounding areas of the vehicle 2 viewed from the virtual perspective VP is generated.

The image generation unit 81b reads out the vehicle body image data from the storage unit 84, and generates the vehicle body image 10 of the vehicle 2 viewed from the virtual perspective VP. Then, the image generation unit 81b synthesizes the vehicle body image 10 into the surrounding image AP indicative of the surrounding areas of the vehicle 2 viewed from the virtual perspective VP, thereby generating a synthesized image CP.

When a virtual perspective VPt of which a perspective position is set immediately above the vehicle 2 and the line of sight is made to face immediately downward is set, the image generation unit 81b generates a synthesized image CPt looking down the vehicle 2 and the surrounding areas of the vehicle 2 by using the surrounding images AP(F), AP(B), AP(L), AP(R) and the vehicle body image 10. The synthesized image CPt is an image looking down the vehicle 2 from immediately above the vehicle and represents the surrounding areas of the vehicle 2.

Also, when a virtual perspective VPb of which a perspective position is set at a front-upper position of the vehicle 2 and the line of sight is made to face towards a rear-lower direction of the vehicle 2, the image generation unit 81b generates a synthesized image CPb looking down the vehicle 2 and the surrounding areas of the vehicle 2 by using the surrounding images AP(B), AP(L), AP(R) and the vehicle body image 10. The synthesized image CPb is an image looking down the rear of the vehicle 2 from a front-upper side and represents the rear area of the vehicle 2.

Also, when a virtual perspective VP1 of which a perspective position is set at an oblique left-rear and upper position of the vehicle 2 and the line of sight is made to face towards a front-lower direction of the vehicle 2, the image generation unit 81b generates a synthesized image CP1 looking down the vehicle 2 and the surrounding areas of the vehicle 2 by using the surrounding images AP(F), AP(L), AP(R) and the vehicle body image 10. The synthesized image CP1 is an image looking down the front of the vehicle 2 from an oblique left-rear and upper direction and represents the left area of the vehicle 2.

1-4. Setting of Virtual Perspective

In the below, a method by which the image generation unit 81b sets the virtual perspective VP is described in detail. FIGS. 7 to 12 depict a method by which the image generation unit 81b sets the virtual perspective VP. In the respective drawings, a direction and an orientation are appropriately indicated using a three-dimensional XYZ Cartesian coordinate system cc. The respective coordinate axes of the Cartesian coordinate system cc are relatively fixed with respect to the vehicle 2. That is, a left-right direction of the vehicle 2 is the X-axis direction, a longitudinal direction of the vehicle 2 is the Y-axis direction, and the vertical direction is the Z-axis direction. Also, the right side of the vehicle 2 is +X side, the front side of the vehicle 2 is +Y side, and the vertically upper side is +Z side. Therefore, the left side of the vehicle 2 is −X side, the rear side of the vehicle 2 is −Y side, and the vertically lower side is −Z side.

FIG. 7 depicts the vehicle 2, as viewed from the vertically upper direction (+Z side), and also illustrates five reference virtual perspectives VPa (VPat, VPaf, VPab, VPal, VPar) of the virtual perspectives VP.

The five reference virtual perspectives VPa include five reference positions (VLt, VLf, VLb, VLl, VLr), five movement center points RC (RCt, RCf, RCb, RCl, RCr) and five reference directions (VDt, VDf, VDb, VDtl, VDr), respectively.

The reference position VLt is located immediately above the vehicle 2. The reference position VLf is located immediately above the vehicle 2 and at a more forward position (+Y side). The reference position VLb is located immediately above the vehicle 2 and at a more rearward position (−Y side). The reference position VLl is located at an oblique left-rear position of the vehicle 2 (−Y side and −X side). The reference position VLr is located at an oblique right-rear position of the vehicle 2 (+X side and −Y side). Heights (+Z side) of the respective reference positions VL are the same from a ground contact surface GR on which the vehicle 2 is contacted. For example, the height is twice as high as the vehicle.

Figure 8:
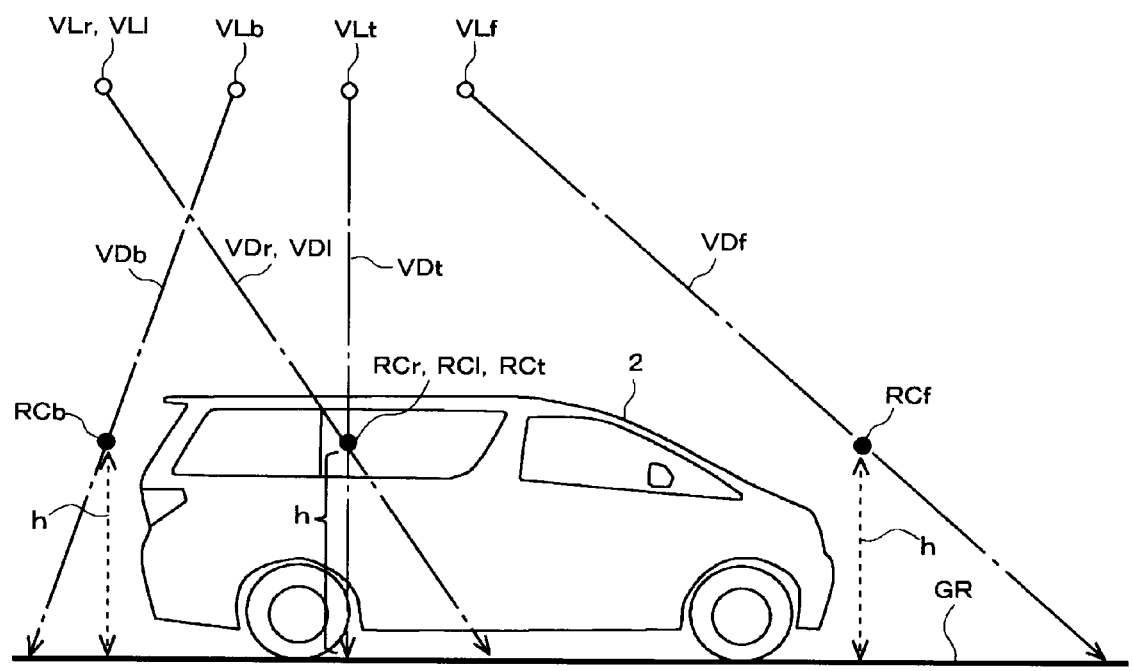
FIG. 8 depicts positions of the virtual perspectives in the image display system of FIG. 1.

FIG. 8 depicts the vehicle 2, as viewed from the right side (+X side) in the horizontal direction, and illustrates the movement center point RC and the reference direction VD. The movement center point RC is a reference point becoming a center when the virtual perspective VP moves. Therefore, even when the perspective position of the virtual perspective VP moves, the line of sight faces towards the movement center point RC all the time. According to this configuration, it is possible to provide a synthesized image enabling the user to feel as if the user were moving while seeing the imaging subject. A method of moving the position of the virtual perspective VP by using the movement center point RC will be described later.

The movement center point RCt is a specific point set at a specific position of the vehicle 2. The movement center point RCt is positioned at a center of the vehicle 2. The movement center point RCf is positioned at a center of the vehicle 2 in the left-right direction and at a more forward position (+Y side) than the front end of the vehicle 2. The movement center point RCb is positioned at the center of the vehicle 2 in the left-right direction and at a more rearward position (−Y side) than the rear end of the vehicle 2. The movement center point RCl is positioned at a center of the vehicle 2 in the longitudinal direction and at an outermore position (−X side) that the left side of the vehicle 2. The movement center point RCr is positioned at the center of the vehicle 2 in the longitudinal direction and at an outermore position (+X side) that the right side of the vehicle 2. A height (+Z side) of each movement center point RC is a height h of an eye line of the user sitting in the vehicle 2.

The reference direction VDt faces a direction (−Z side) from the reference position VLt towards the movement center point RCt. The reference direction VDf faces a direction (−Z side and +Y side) from the reference position VLf towards the movement center point RCf. The reference direction VDb faces a direction (−Z side and −Y side) from the reference position VLb towards the movement center point RCb. The reference direction VDl faces a direction (−Z side and +Y side) from the reference position VLl towards the movement center point RCl. The reference direction VDr faces a direction (−Z side and +Y side) from the reference position VLr towards the movement center point RCr.

Like this, the virtual perspective VP is a perspective viewing the movement center point RC from the perspective position VL. Also, a reference virtual perspective VPat is a perspective looking down the vehicle 2 immediately above the vehicle (top view). A reference virtual perspective VPaf is a perspective viewing the front of the vehicle 2 from a front-upper direction (front view). A reference virtual perspective VPab is a perspective viewing the rear of the vehicle 2 from a rear-upper direction (back view). A reference virtual perspective VPal is a perspective viewing the left area of the vehicle 2 from an oblique left-rear and upper direction (left side view). A reference virtual perspective VPar is a perspective viewing the right area of the vehicle 2 from an oblique right-rear and upper direction (right side view).

The reference virtual perspective VPa is selected by the user. The user's selection is made by a touch operation on a touch panel button associated with each reference virtual perspective VPa. That is, when the user selects any one reference virtual perspective VPa while the synthesized image CP is displayed on the display, the image generation unit 81b generates a synthesized image viewed from the selected reference virtual perspective VPa. Thereby, even when the virtual perspective cannot be returned to the reference virtual perspective VPa after diversely changing the position of the virtual perspective, the user can easily set the virtual perspective to the reference virtual perspective VPa by the touch operation on the touch panel button.

At an initial stage of the image display before the user selects a perspective, any one of the reference virtual perspectives VPa is set in advance. At this time, it is preferably to generate the synthesized image CP at the reference virtual perspective VPat looking down the vehicle 2 immediately above the vehicle. The reason is that the synthesized image CP can present the user with the wide areas around the vehicle 2 and is thus suitable for the initial display.

In the below, a method of moving the perspective position VL by using the movement center point RC is described. First, a method of moving the perspective position VL in the left-right direction (horizontal direction) while the user sees the display is described with reference to FIGS. 9 and 10. The movement of the perspective position VL, which will be described below, is performed in correspondence to the user's flick operation on the touch panel in the left-right direction (the horizontal direction).

FIG. 9 depicts the vehicle 2 viewed from the vertically upper direction (+Z side), and also illustrates a movement path of the reference position VLI of the reference virtual perspective VPal. The reference position VLI moves along a movement path OBlh having the movement center point RCI as a center. The movement of the perspective position VL is based on the Cartesian coordinate system cc (the world coordinate system) that is relatively fixed to the vehicle 2 having a position of the movement center point RCI as an origin. The coordinate axis becoming a movement reference of the reference position VLI is the Z axis of the Cartesian coordinate system cc at the position of the movement center point RC.

FIG. 10 depicts the vehicle 2 viewed from the right side (+X side) in the horizontal direction, and also illustrates the movement path of the reference position VLI of the reference virtual perspective VPal, like FIG. 9. The reference position VLI moves along the movement path OBlh having the movement center point RCI as a center. The coordinate axis becoming a movement reference of the reference position VLI is the Z axis (AXI) of the Cartesian coordinate system cc at the position of the movement center point RC.

In FIGS. 9 and 10, the reference direction VDI always faces the direction from the reference position VLI towards the movement center point RCI even when the reference position VLI is located at any position on the movement path OBlh. Therefore, when the reference position VLI moves along the movement path OBlh, the user seeing the display 83 feels as if the image moves laterally.

When the user performs the flick operation from the left direction towards the right direction (in the horizontal direction) on the touch panel 83a, the reference position VLI moves in a counterclockwise direction along the movement path OBlh. On the other hand, when the user performs the flick operation from the right direction towards the left direction (in the horizontal direction) on the touch panel 83a, the reference position VLI moves in a clockwise direction along the movement path OBlh. Thereby, the direction of the user's flick operation and the moving direction of the image coincide with each other, and the user can intuitively perform the touch panel operation.

In the below, a method of moving the perspective position VL in the upper-lower direction (vertical direction) while the user sees the display is described with reference to FIGS. 11 and 12. The movement of the perspective position VL, which will be described below, is performed in correspondence to the user's flick operation on the touch panel in the upper-lower direction (vertical direction).

Figure 11:
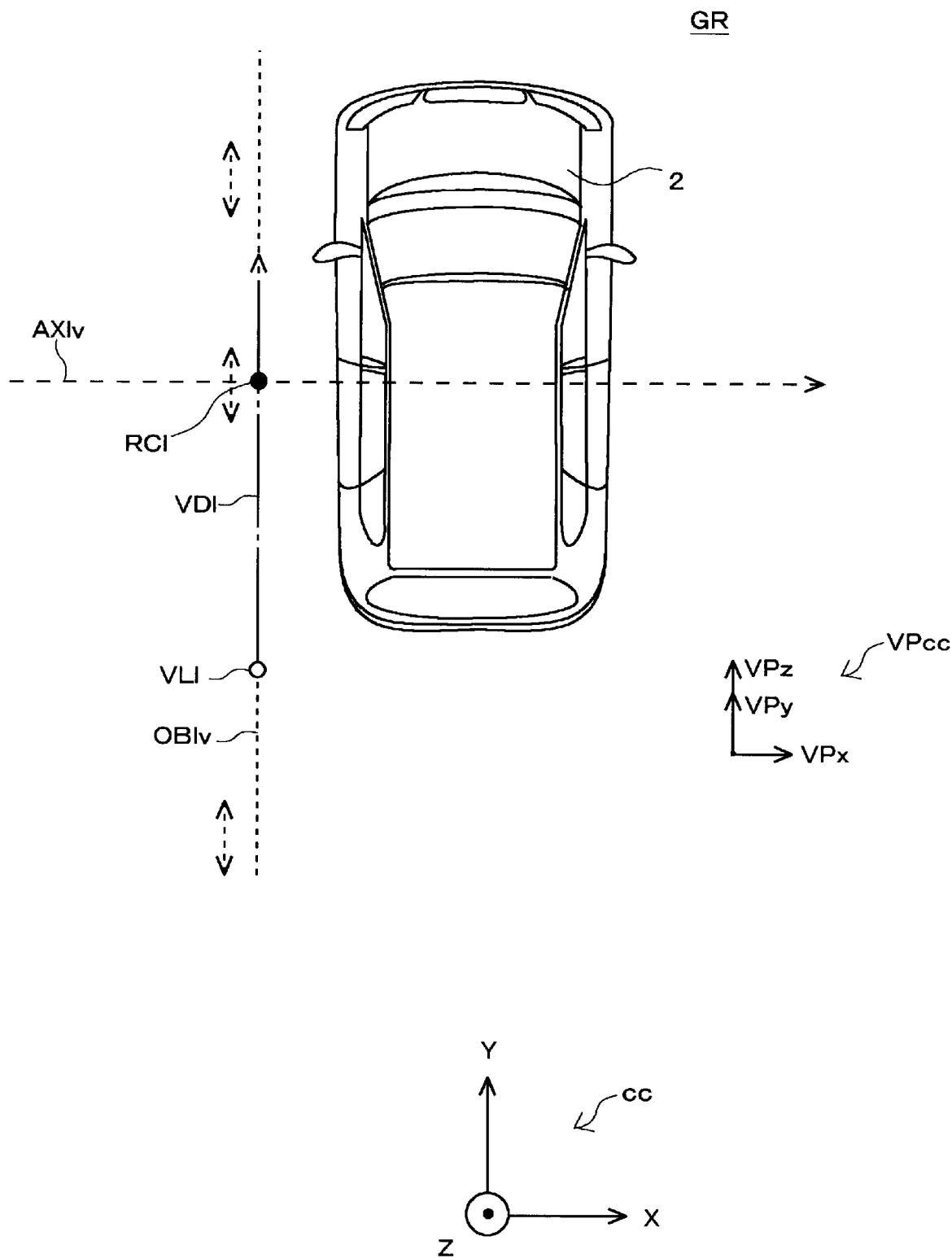
FIG. 11 depicts movement of the virtual perspective in the image display system of FIG. 1.
Figure 12:
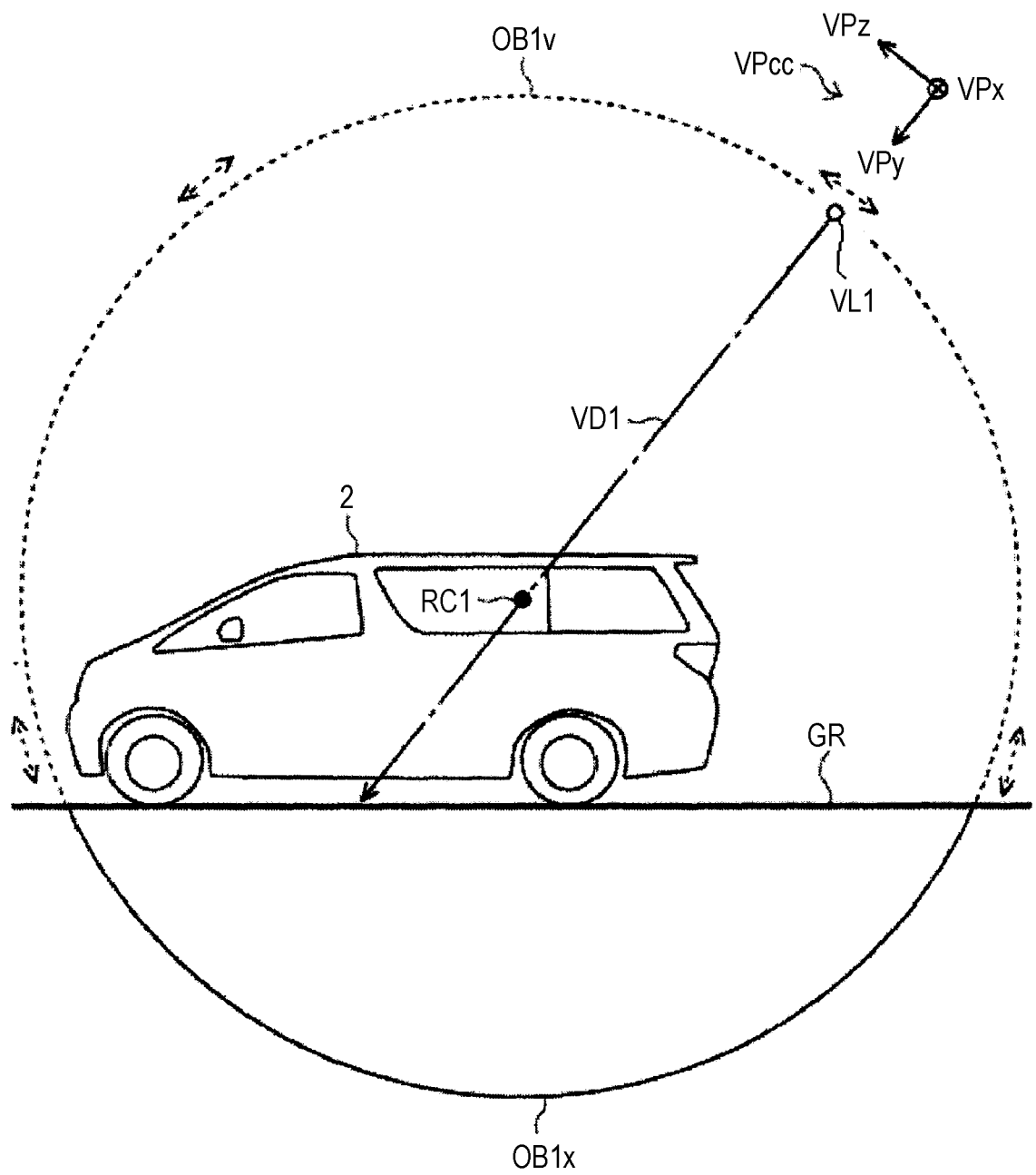
FIG. 12 depicts movement of the virtual perspective in the image display system of FIG. 1.

In FIGS. 11 and 12, the direction and the orientation are appropriately shown using the three-dimensional XYZ Cartesian coordinate system VPcc (the perspective coordinate system), in addition to the three-dimensional XYZ Cartesian coordinate system cc. The respective coordinate axes of the Cartesian coordinate system VPcc are relatively fixed with respect to the virtual perspective VP. That is, the left-right direction of the virtual perspective VP is the X-axis (VPx) direction, the longitudinal direction of the virtual perspective VP is the Y-axis (VPy) direction, and the vertical direction of the virtual perspective VP is the Z-axis (VPz) direction. Also, the right side of the virtual perspective VP is +X side, the front side of the virtual perspective VP is +Y side, and the vertically upper side of the virtual perspective VP is +Z side. Therefore, the left side of the virtual perspective VP is −X side, the rear side of the virtual perspective VP is −Y side, and the vertically lower side is −Z side.

FIG. 11 depicts the vehicle 2 viewed from the vertically upper direction (+Z side), and also illustrates a movement path of the reference position VLI of the reference virtual perspective VPal. The reference position VLI moves along a movement path OBlv having the movement center point RCI as a center. The movement of the perspective position VL is based on the Cartesian coordinate system VPcc that is relatively fixed to the virtual perspective VP having a position of the movement center point RCI as an origin. The coordinate axis becoming a movement reference of the reference position VLI is the X axis (AXIv) of the Cartesian coordinate system VPcc at the position of the movement center point RCI.

FIG. 12 depicts the vehicle 2 viewed from the left side (−X side) in the horizontal direction, and also illustrates the movement path of the reference position VLI of the reference virtual perspective VPal, like FIG. 11. The reference position VLI moves along the movement path OBlh having the movement center point RCI as a center. The coordinate axis becoming a movement reference of the reference position VLI is the X axis of the Cartesian coordinate system cc at the position of the movement center point RC.

In FIGS. 11 and 12, the reference direction VDI always faces the direction from the reference position VLI towards the movement center point RCI even when the reference position VLI is located at any position on the movement path OBlv. Therefore, when the reference position VLI moves along the movement path OBlv, the user seeing the display 83 feels as if the image moves in the upper-lower direction.

In the meantime, the movement path OBlv is set above the ground contact surface GR of the vehicle 2. Therefore, the reference position VLI moves along the movement path OBlv shown with the broken line and does not move along a movement path OBlx shown with the solid line. Thereby, it is possible to prevent an image display in which the vehicle 2 is viewed from below the ground contact surface, which cannot be usually assumed. Therefore, the user can move the perspective position without any uncomfortable feeling.

When the user performs the flick operation from the upper direction towards the lower direction (in the vertical direction) on the touch panel 83a, the reference position VLI moves in the clockwise direction along the movement path OBlv. On the other hand, when the user performs the flick operation from the lower direction towards the upper direction (in the vertical direction) on the touch panel 83a, the reference position VLI moved in the counterclockwise direction along the movement path OBlv. Thereby, the direction of the user's flick operation and the moving direction of the image coincide with each other, and the user can intuitively perform the touch panel operation.

1-5. Display Examples of Synthesized Image

In the below, examples of the synthesized image CP that is to be displayed on the display 83 are described with reference to FIGS. 13 to 24.

Figure 13:
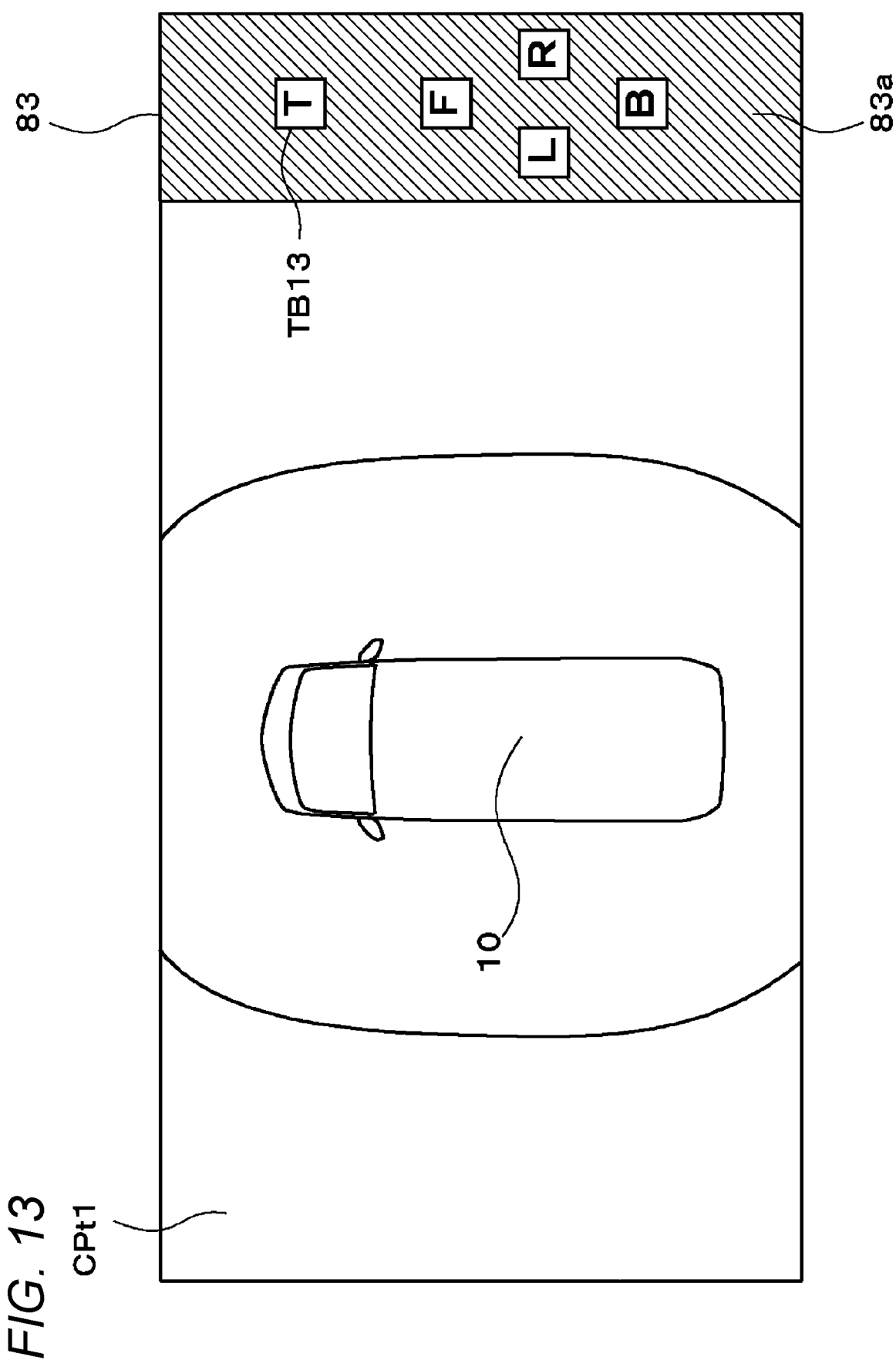
FIG. 13 depicts an example of a display image in the image display system of FIG. 1.

FIG. 13 depicts an example where a synthesized image CPt1 is displayed on the display 83. The synthesized image CPt1 is an image where the vehicle 2 is viewed from the reference virtual perspective VPat set as the virtual perspective VP. The synthesized image CPt1 displays the vehicle body image 10, in addition to the surrounding image indicative of the surroundings of the vehicle 2. The synthesized image CPt1 is displayed at the initial display stage of the synthesized image CP and when the user touches a touch panel button TB13 indicative of the surroundings of the vehicle 2. The user can collectively check the surrounding situations of the vehicle 2 by referring to the synthesized image CPt1.

Figure 14:
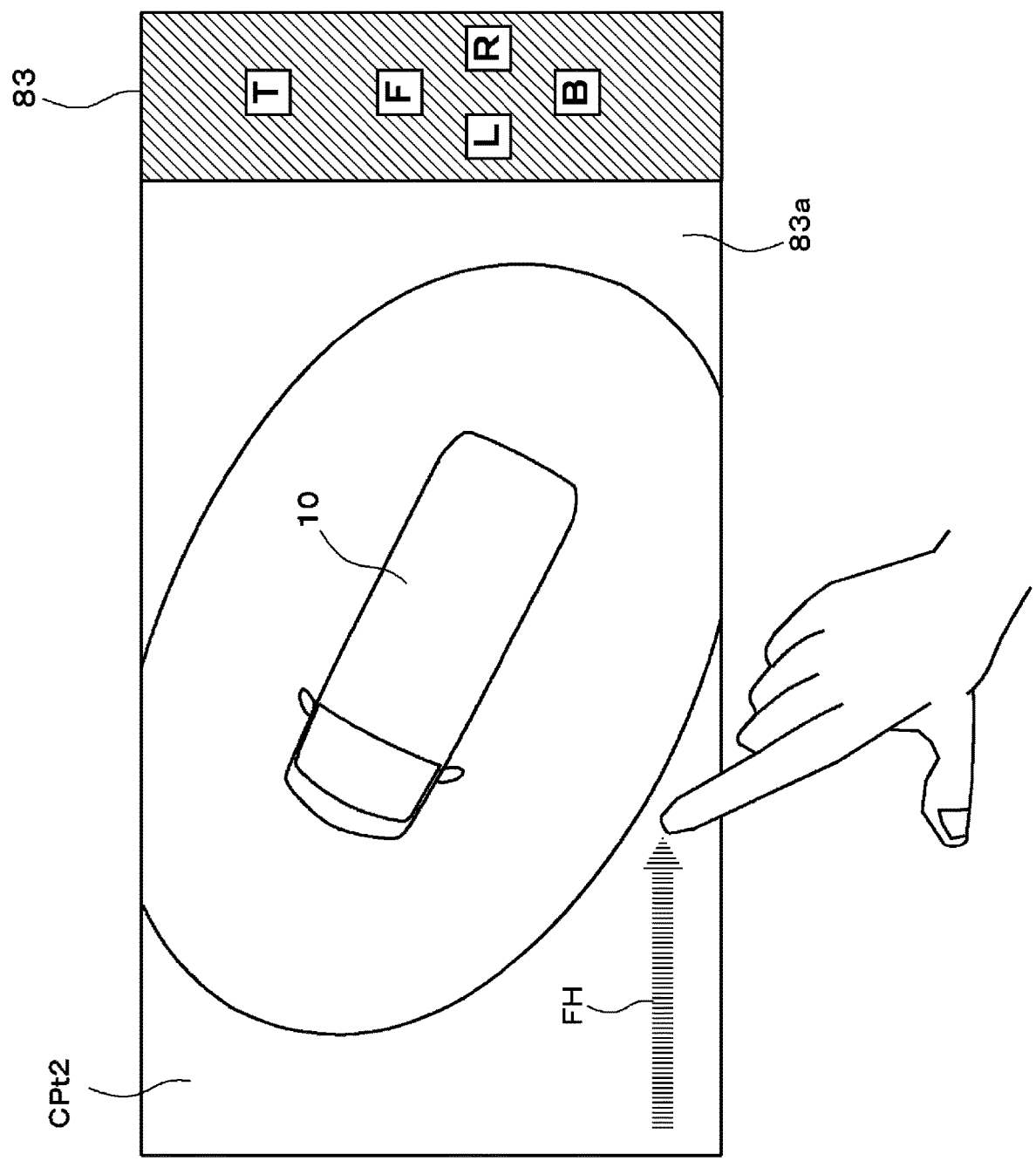
FIG. 14 depicts an example of the display image in the image display system of FIG. 1.

FIG. 14 depicts an example where a synthesized image CPt2 is displayed on the display 83. The synthesized image CPt2 is an image where the vehicle 2 is viewed from the reference virtual perspective VPat set by moving the reference position in the clockwise direction along the movement path OBlh of FIG. 9 after the display of the synthesized image CPt1 (FIG. 13). The synthesized image CPt2 displays the vehicle body image 10, in addition to the surrounding image indicative of the surroundings of the vehicle 2 displayed by rotating leftwards the vehicle while the user sees the display 8. The synthesized image CPt2 is displayed when a flick operation FH is performed from the left direction towards the right direction (in the horizontal direction) on the touch panel 83a with the synthesized image CPt1 (FIG. 13) being displayed. The user can check the surrounding situations of the vehicle 2 at a different angle from the synthesized image CPt1 by referring to the synthesized image CPt2.

Figure 15:
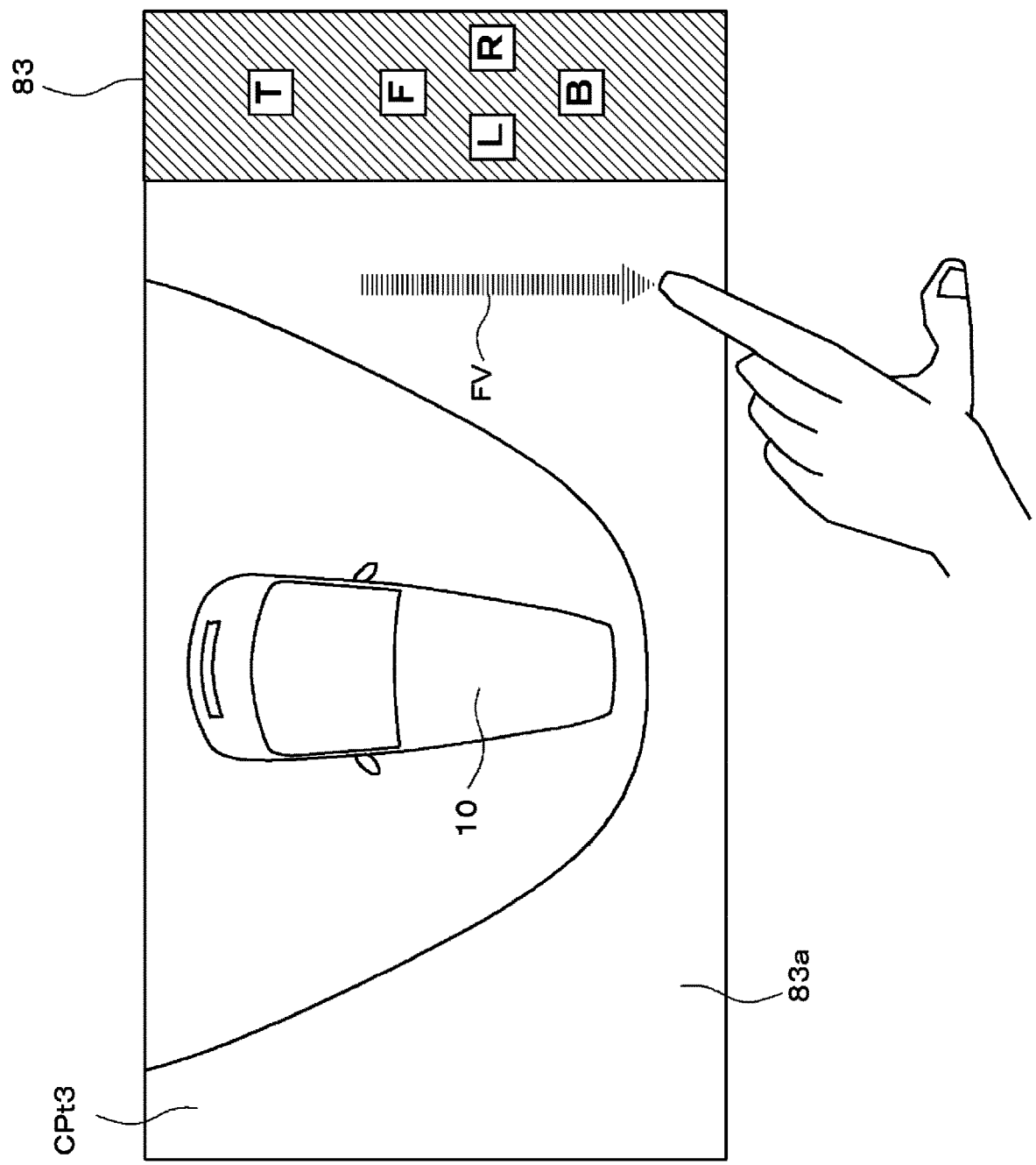
FIG. 15 depicts an example of the display image in the image display system of FIG. 1.

FIG. 15 depicts an example where a synthesized image CPt3 is displayed on the display 83. The synthesized image CPt3 is an image where the vehicle 2 is viewed from the reference virtual perspective VPat set by moving the reference position in the counterclockwise direction along the movement path OBlh of FIG. 12 after the display of the synthesized image CPt1 (FIG. 13). The synthesized image CPt3 is displayed to include a part immediately below the front end of the vehicle 2. The synthesized image CPt3 is displayed when a flick operation FV is performed from the upper direction towards the lower direction (in the vertical direction) on the touch panel 83a with the synthesized image CPt1 (FIG. 13) being displayed. The user can check the surrounding situations of the vehicle 2 including the part immediately below the front end of the vehicle 2 by referring to the synthesized image CPt3.

Figure 16:
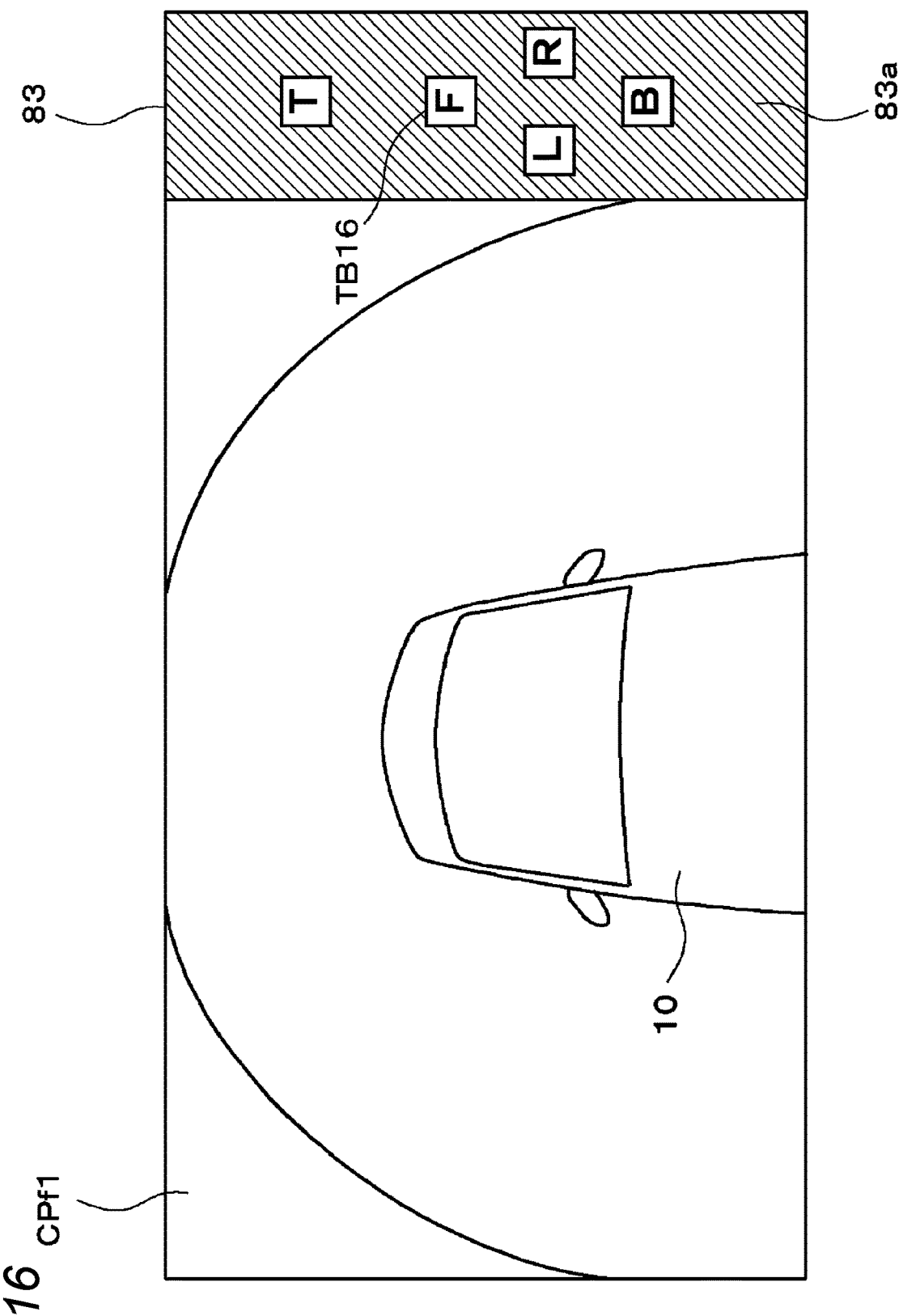
FIG. 16 depicts an example of the display image in the image display system of FIG. 1.

FIG. 16 depicts an example where a synthesized image CPf1 is displayed on the display 83. The synthesized image CPf1 is an image where the vehicle 2 is viewed from the reference virtual perspective VPaf set as the virtual perspective VP. The synthesized image CPf1 displays the vehicle body image 10, in addition to the surrounding image indicative of the front of the vehicle 2. The synthesized image CPf1 is displayed when the user touches a touch panel button TB16 indicative of the front of the vehicle 2. The user can check the front situations of the vehicle 2 by referring to the synthesized image CPf1.

Figure 17:
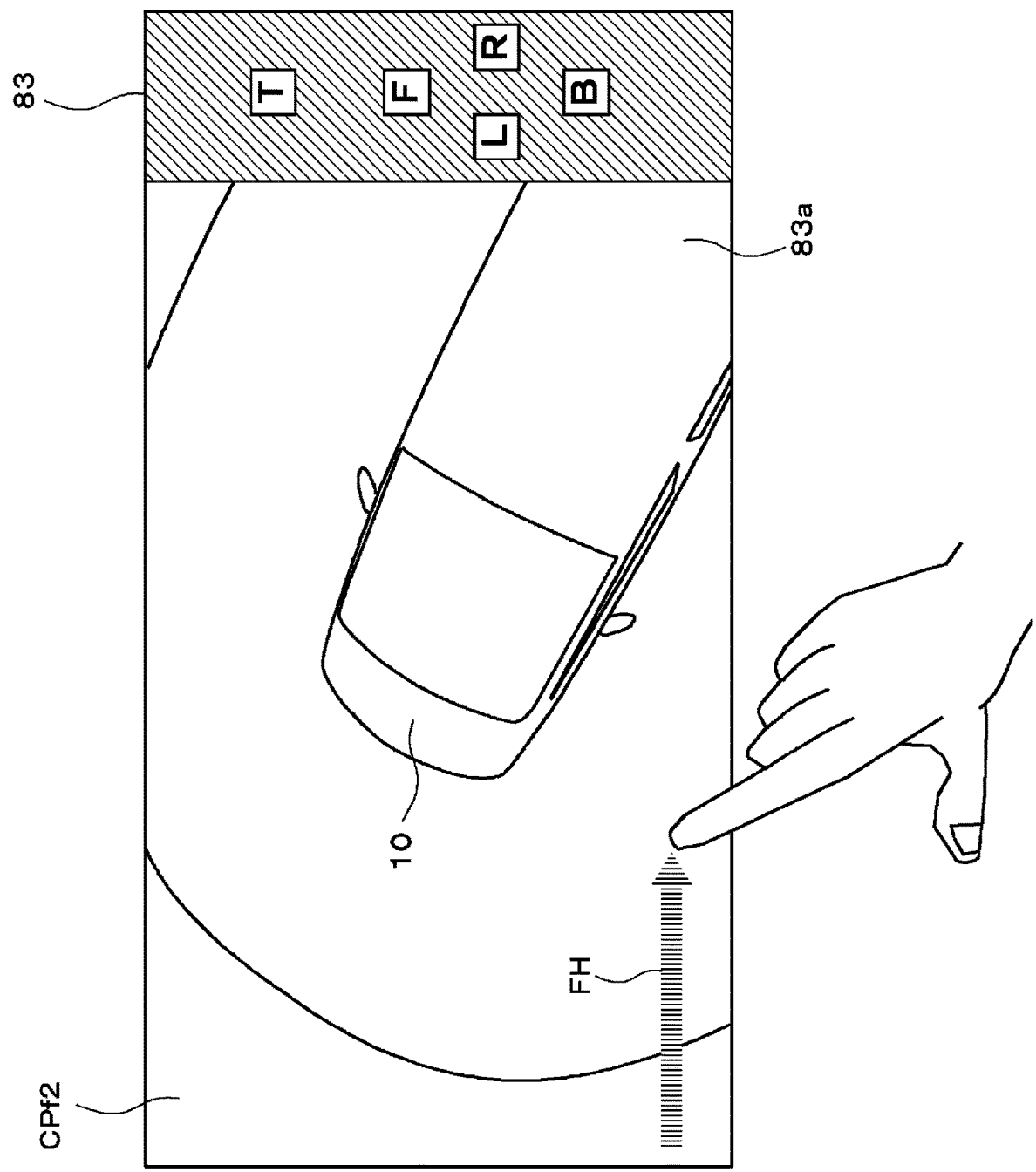
FIG. 17 depicts an example of the display image in the image display system of FIG. 1.

FIG. 17 depicts an example where a synthesized image CPf2 is displayed on the display 83. The synthesized image CPf2 is an image where the vehicle 2 is viewed from the reference virtual perspective VPaf set by moving the reference position in the clockwise direction along the movement path OBlh of FIG. 9 after the display of the synthesized image CPf1 (FIG. 16). The synthesized image CPf2 displays the vehicle body image 10, in addition to the surrounding image indicative of the surroundings of the vehicle 2 displayed by rotating leftwards the vehicle while the user sees the display 8. The synthesized image CPf2 is displayed when the flick operation FH is performed from the left direction towards the right direction (in the horizontal direction) on the touch panel 83a with the synthesized image CPf1 (FIG. 16) being displayed. The user can check the front situations of the vehicle 2 at a different angle from the synthesized image CPf1 by referring to the synthesized image CPf2.

Figure 18:
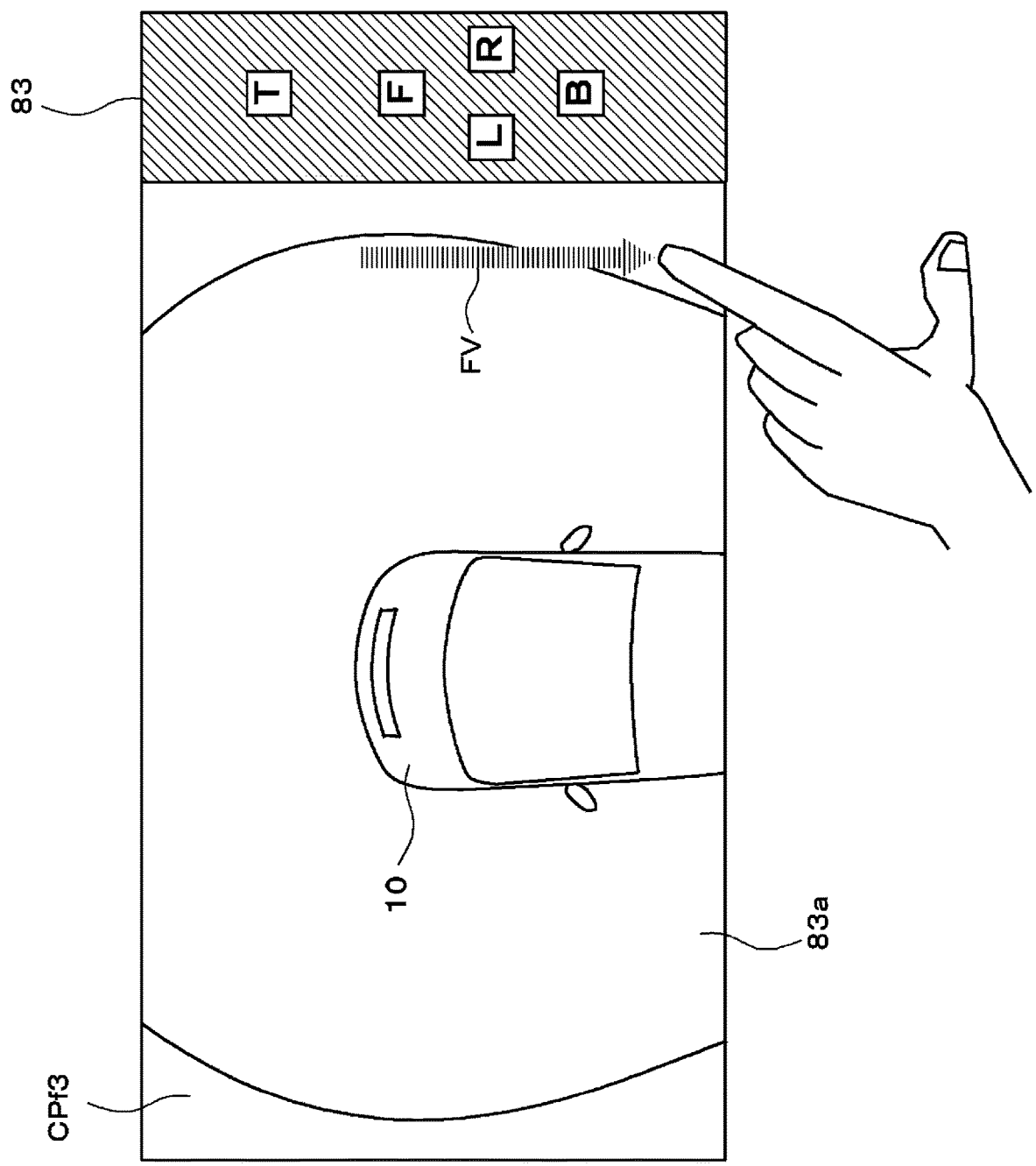
FIG. 18 depicts an example of the display image in the image display system of FIG. 1.

FIG. 18 depicts an example where a synthesized image CPf3 is displayed on the display 83. The synthesized image CPf3 is an image where the vehicle 2 is viewed from the reference virtual perspective VPaf set by moving the reference position in the counterclockwise direction along the movement path OBlh of FIG. 12 after the display of the synthesized image CPf1 (FIG. 13). The synthesized image CPf3 displays the front area of the vehicle 2 in more detail than the synthesized image CPf1. The synthesized image CPf3 is displayed when the flick operation FV is performed from the upper direction towards the lower direction (in the vertical direction) on the touch panel 83a with the synthesized image CPf1 (FIG. 16) being displayed. The user can check the front situations of the vehicle 2 in detail by referring to the synthesized image CPf3.

Figure 19:
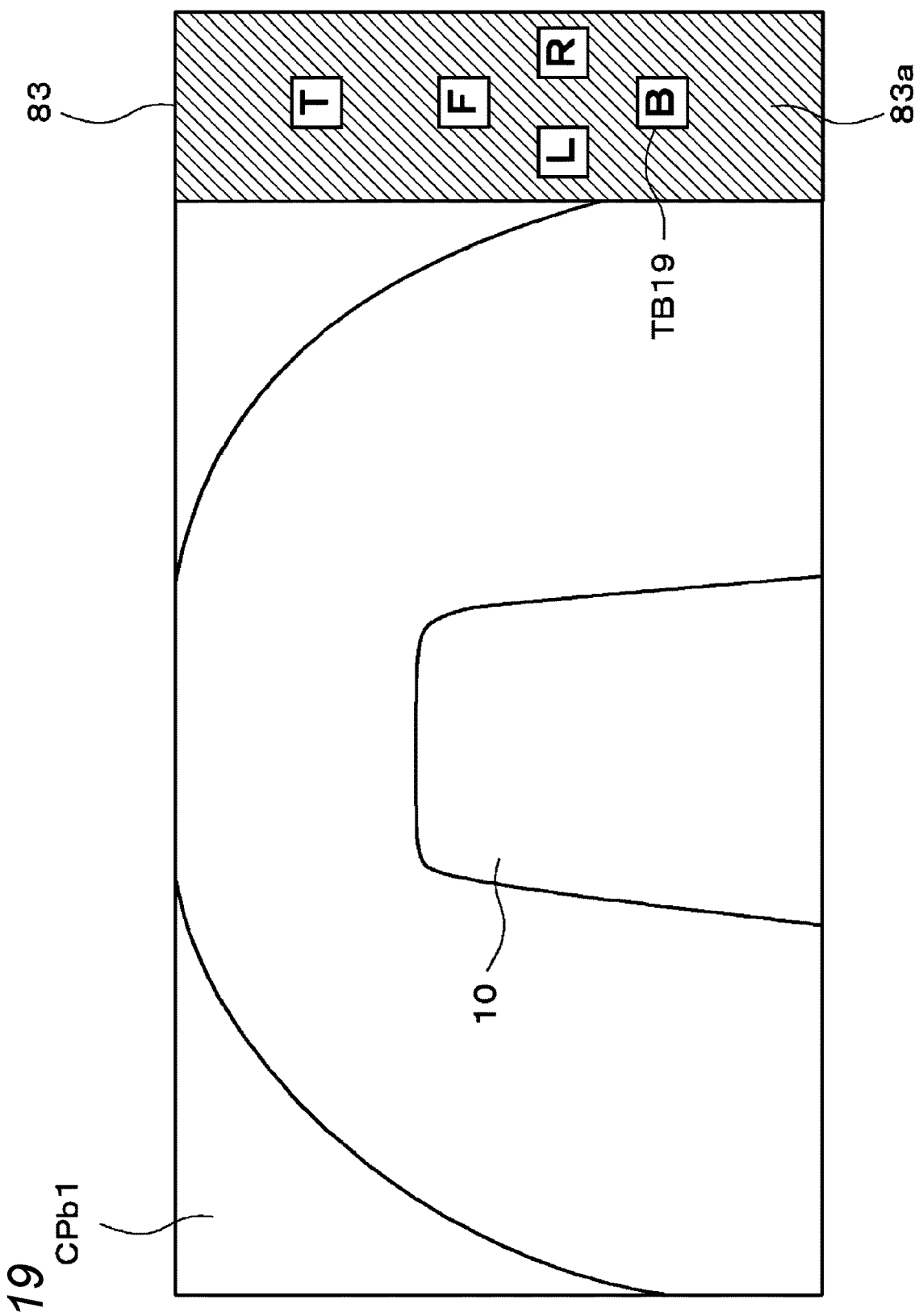
FIG. 19 depicts an example of the display image in the image display system of FIG. 1.

FIG. 19 depicts an example where a synthesized image CPb1 is displayed on the display 83. The synthesized image CPb1 is an image where the vehicle 2 is viewed from the reference virtual perspective VPab set as the virtual perspective VP. The synthesized image CPb1 displays the vehicle body image 10, in addition to the surrounding image indicative of the rear of the vehicle 2. The synthesized image CPb1 is displayed when the user touches a touch panel button TB19 indicative of the rear of the vehicle 2. The user can check the rear situations of the vehicle 2 by referring to the synthesized image CPb1.

Figure 20:
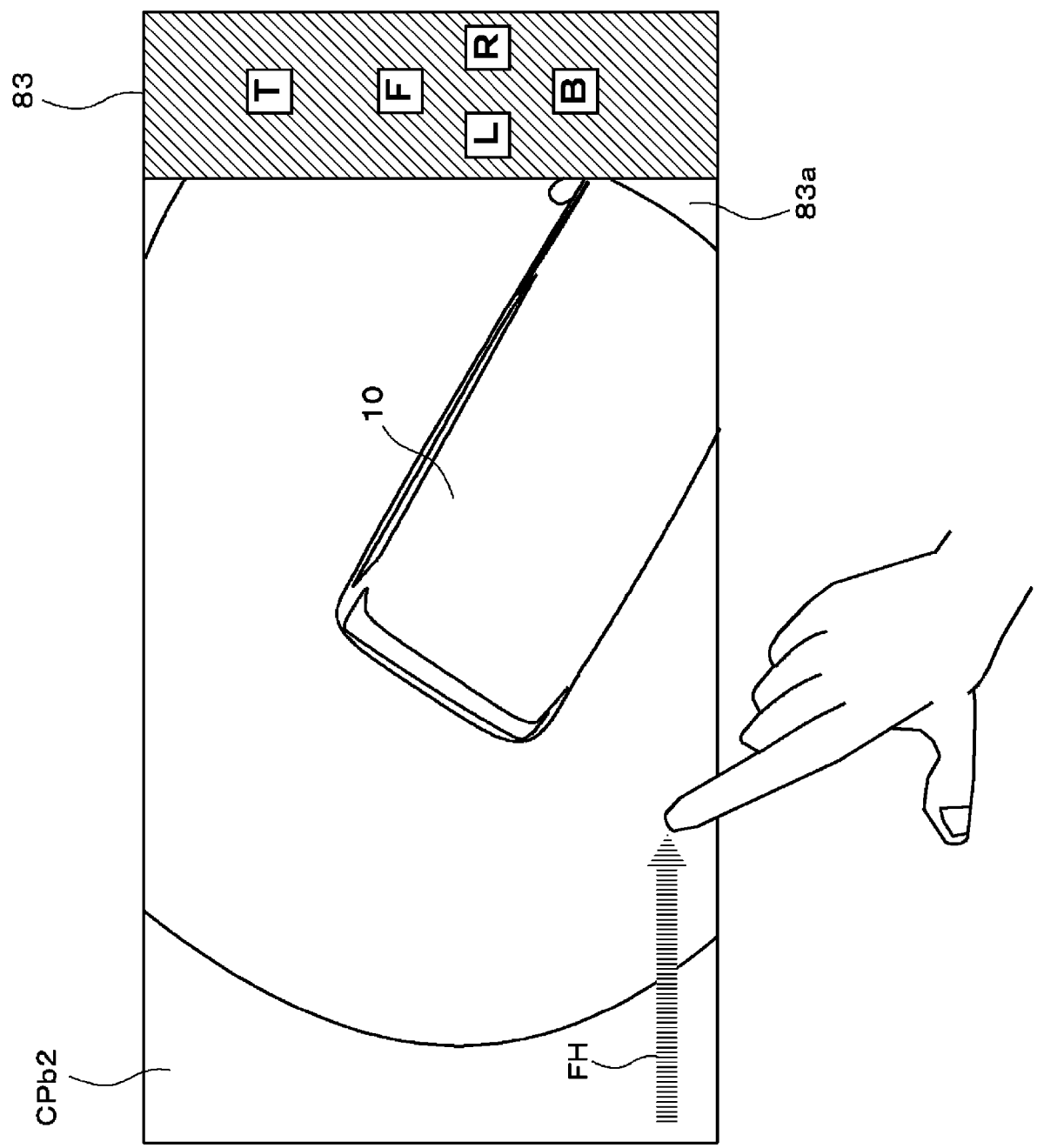
FIG. 20 depicts an example of the display image in the image display system of FIG. 1.

FIG. 20 depicts an example where a synthesized image CPb2 is displayed on the display 83. The synthesized image CPb2 is an image where the vehicle 2 is viewed from the reference virtual perspective VPab set by moving the reference position in the clockwise direction along the movement path OBlh of FIG. 9 after the display of the synthesized image CPb1 (FIG. 19). The synthesized image CPb2 displays the vehicle body image 10, in addition to the surrounding image indicative of the rear of the vehicle 2 displayed by moving leftwards the vehicle while the user sees the display 8. The synthesized image CPb2 is displayed when the flick operation FH is performed from the left direction towards the right direction (in the horizontal direction) on the touch panel 83a with the synthesized image CPb1 (FIG. 19) being displayed. The user can check the rear situations of the vehicle 2 at a different angle from the synthesized image CPb1 by referring to the synthesized image CPb2.

Figure 21:
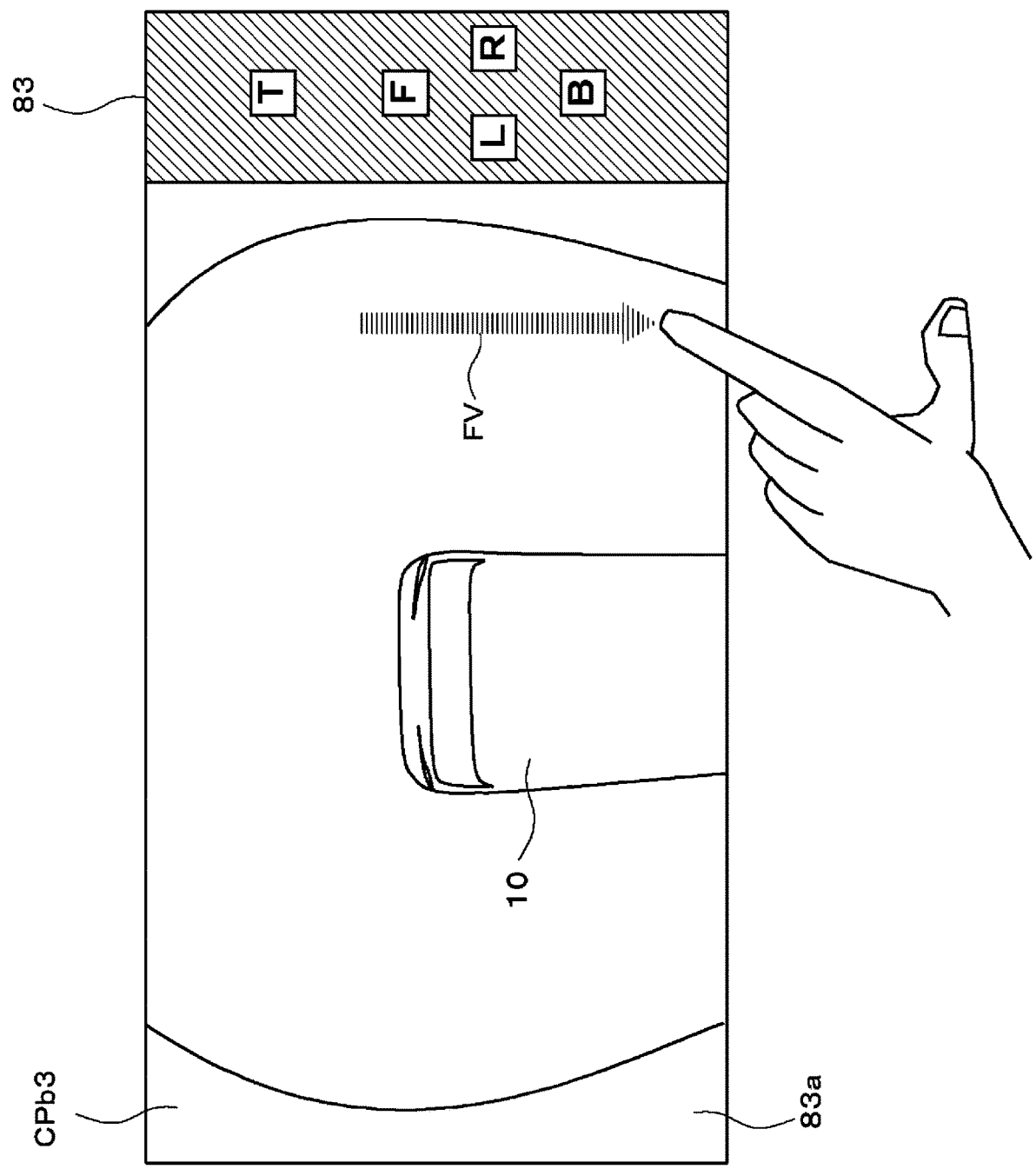
FIG. 21 depicts an example of the display image in the image display system of FIG. 1.

FIG. 21 depicts an example where a synthesized image CPb3 is displayed on the display 83. The synthesized image CPb3 is an image where the vehicle 2 is viewed from the reference virtual perspective VPab set by moving the reference position in the counterclockwise direction along the movement path OBlh of FIG. 12 after the display of the synthesized image CPb1 (FIG. 19). The synthesized image CPb3 displays the rear area of the vehicle 2 in more detail than the synthesized image CPb1. The synthesized image CPb3 is displayed when the flick operation FV is performed from the upper direction towards the lower direction (in the vertical direction) on the touch panel 83a with the synthesized image CPb1 (FIG. 16) being displayed. The user can check the rear situations of the vehicle 2 in detail by referring to the synthesized image CPb3.

Figure 22:
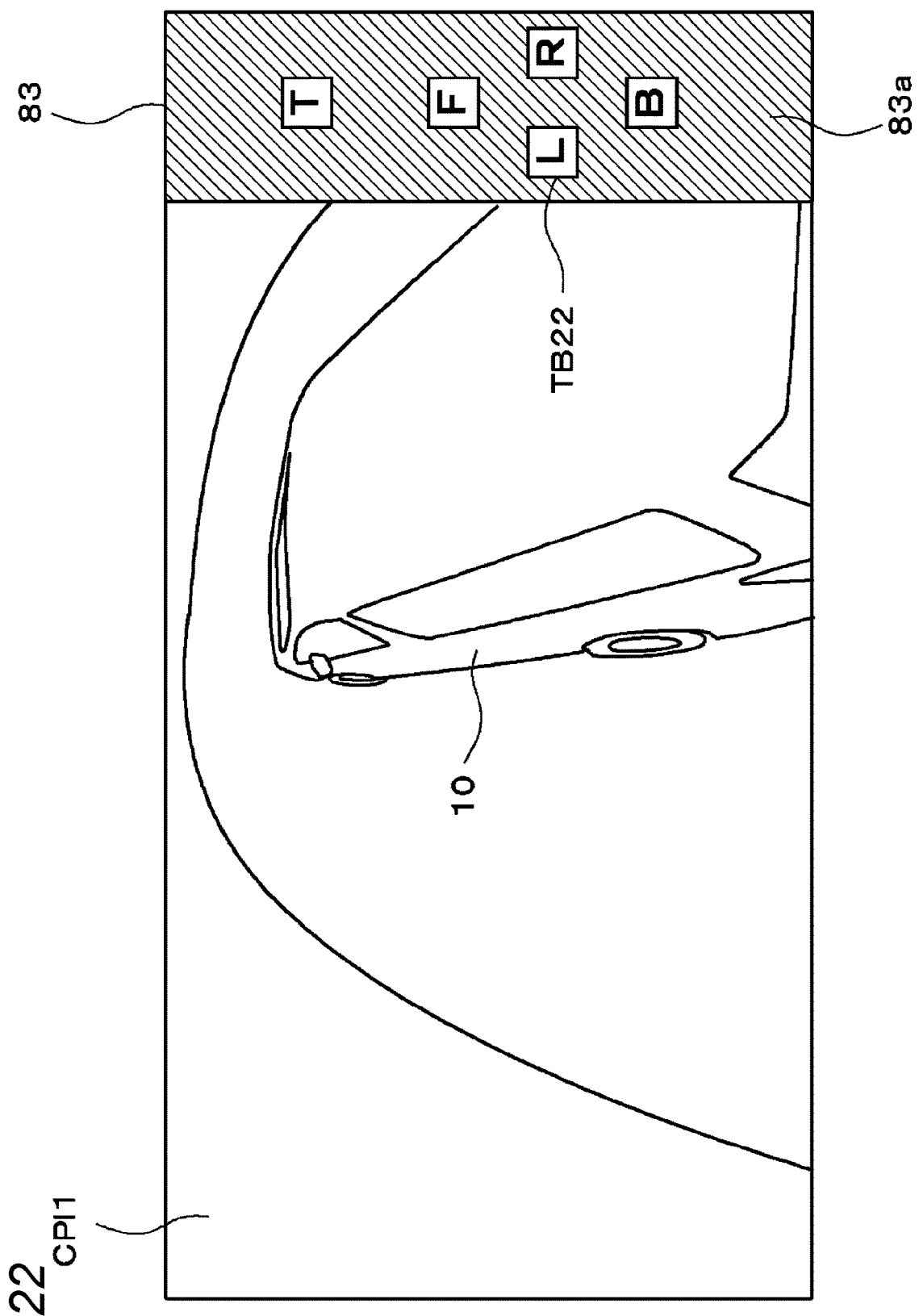
FIG. 22 depicts an example of the display image in the image display system of FIG. 1.

FIG. 22 depicts an example where a synthesized image CPI1 is displayed on the display 83. The synthesized image CPI1 is an image where the vehicle 2 is viewed from the reference virtual perspective VPal set as the virtual perspective VP. The synthesized image CPI1 displays the vehicle body image 10, in addition to the surrounding image indicative of the left of the vehicle 2. The synthesized image CPI1 is displayed when the user touches a touch panel button TB22 indicative of the left of the vehicle 2. The user can check the left situations of the vehicle 2 by referring to the synthesized image CPI1.

Figure 23:
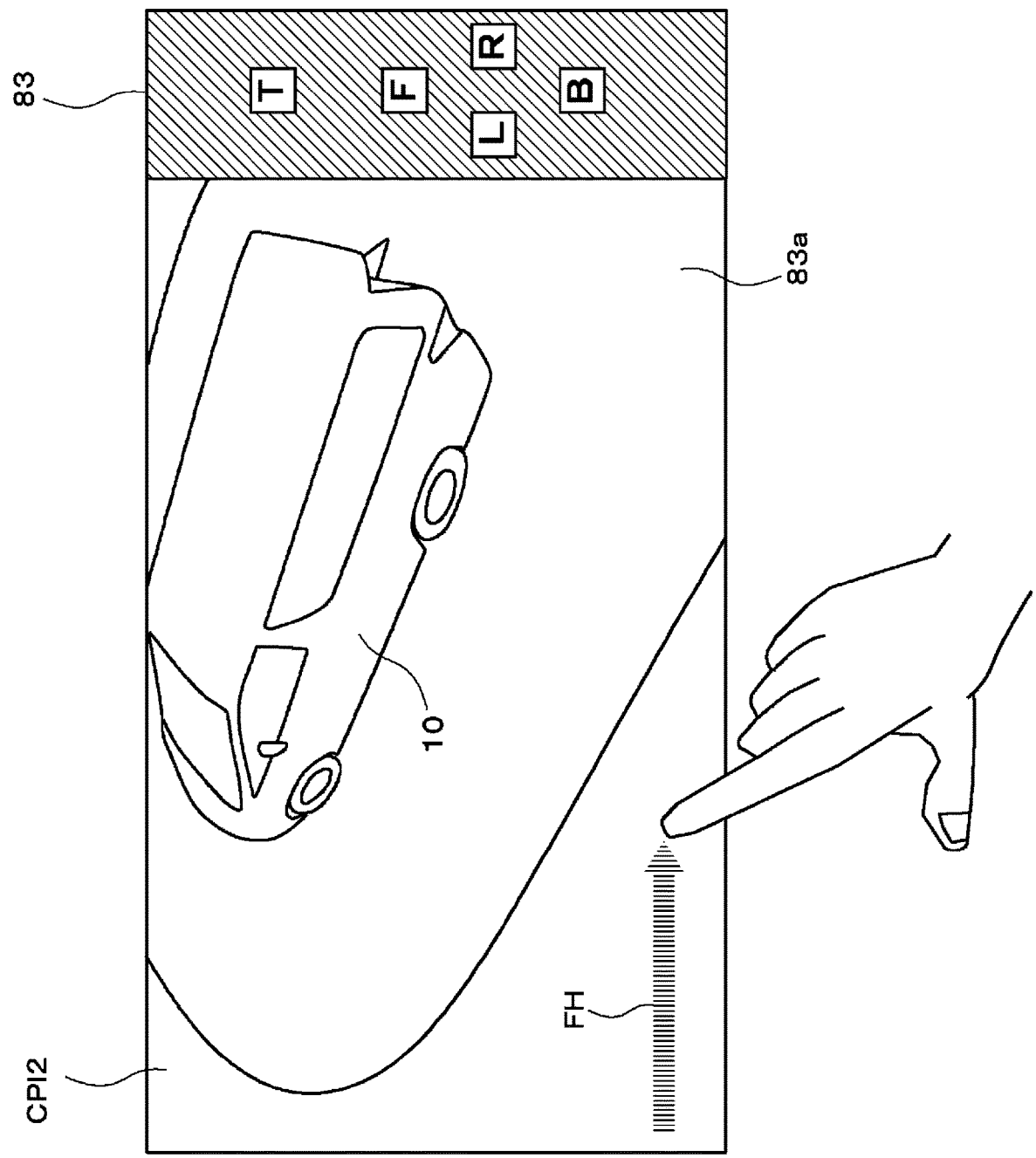
FIG. 23 depicts an example of the display image in the image display system of FIG. 1.

FIG. 23 depicts an example where a synthesized image CPI2 is displayed on the display 83. The synthesized image CPI2 is an image where the vehicle 2 is viewed from the reference virtual perspective VPal set by moving the reference position in the clockwise direction along the movement path OBlh of FIG. 9 after the display of the synthesized image CPI1 (FIG. 22). The synthesized image CPI2 displays the vehicle body image 10, in addition to the surrounding image indicative of the left of the vehicle 2 displayed by moving leftwards the vehicle while the user sees the display 8. The synthesized image CPI2 is displayed when the flick operation FH is performed from the left direction towards the right direction (in the horizontal direction) on the touch panel 83a with the synthesized image CPI1 (FIG. 22) being displayed. The user can check the left situations of the vehicle 2 at a different angle from the synthesized image CPI1 by referring to the synthesized image CPI2.

Figure 24:
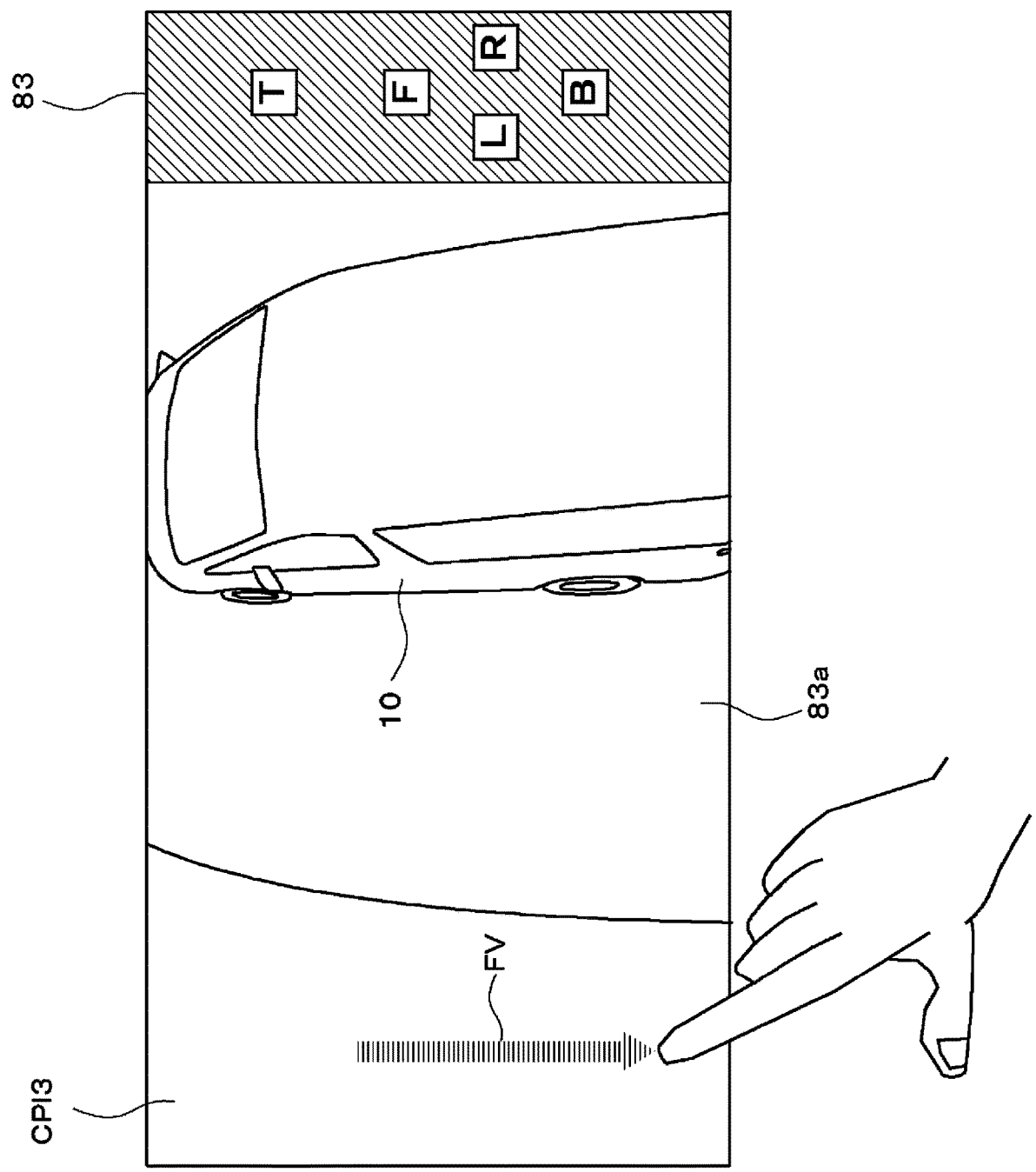
FIG. 24 depicts an example of the display image in the image display system of FIG. 1.

FIG. 24 depicts an example where a synthesized image CPI3 is displayed on the display 83. The synthesized image CPI3 is an image where the vehicle 2 is viewed from the reference virtual perspective VPal set by moving the reference position in the counterclockwise direction along the movement path OBlh of FIG. 12 after the display of the synthesized image CPI1 (FIG. 22). The synthesized image CPI3 displays the left area of the vehicle 2 in more detail than the synthesized image CPI1. The synthesized image CPI3 is displayed when the flick operation FV is performed from the upper direction towards the lower direction (in the vertical direction) on the touch panel 83a with the synthesized image CPI1 (FIG. 22) being displayed. The user can check the left situations of the vehicle 2 in detail by referring to the synthesized image CPI3.

Regarding the synthesized image CP indicative of the right of the vehicle 2, the operation and control may be performed in a bilaterally symmetric manner with the case described with reference to FIGS. 22 to 24 depicting the left of the vehicle 2. The user can check the right situations of the vehicle 2 by referring to the synthesized image CP indicative of the right of the vehicle 2.

1-6. Processing

Figure 25:
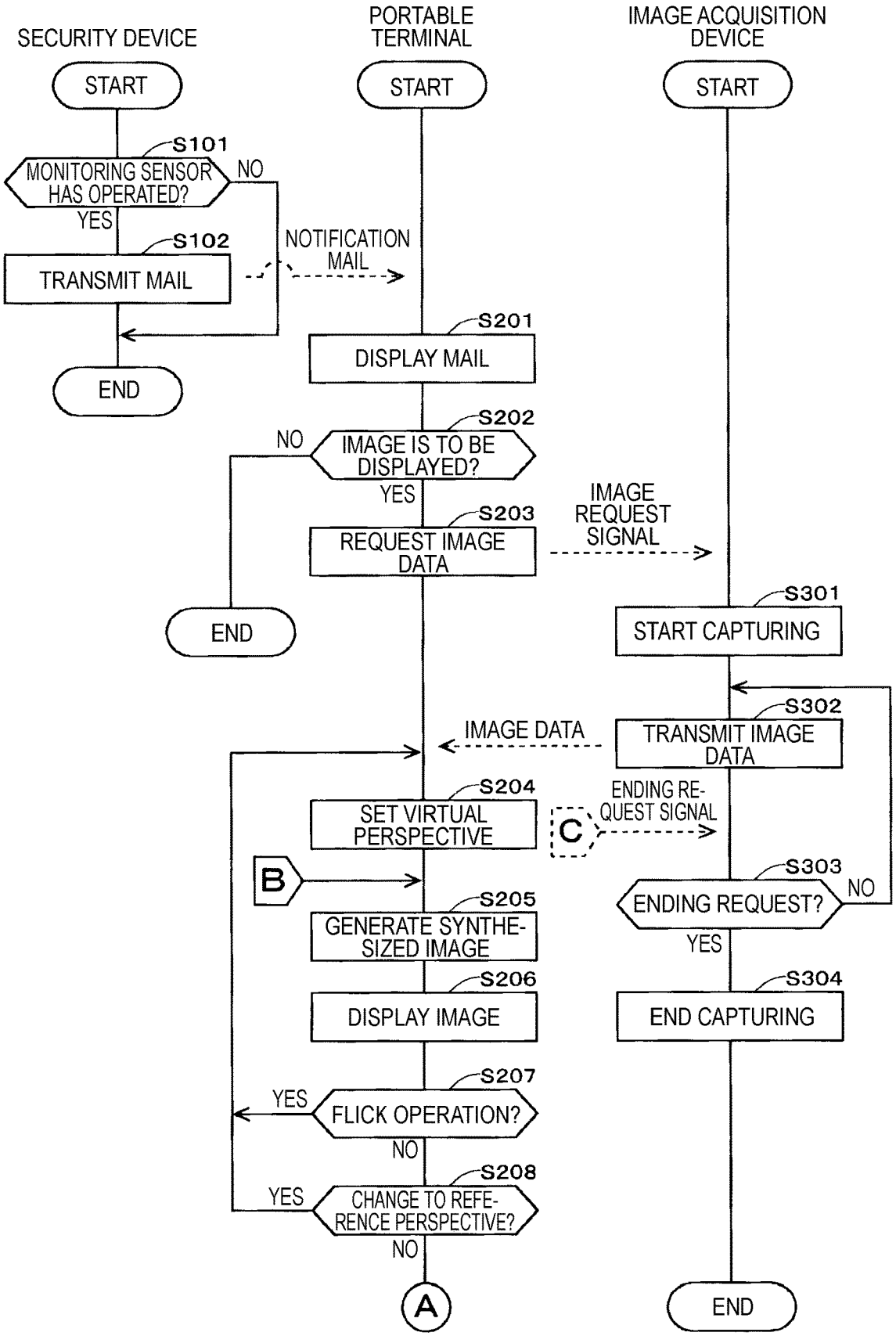
FIG. 25 is a flow chart depicting a processing sequence that is to be executed by the image display system of FIG. 1.
Figure 26:
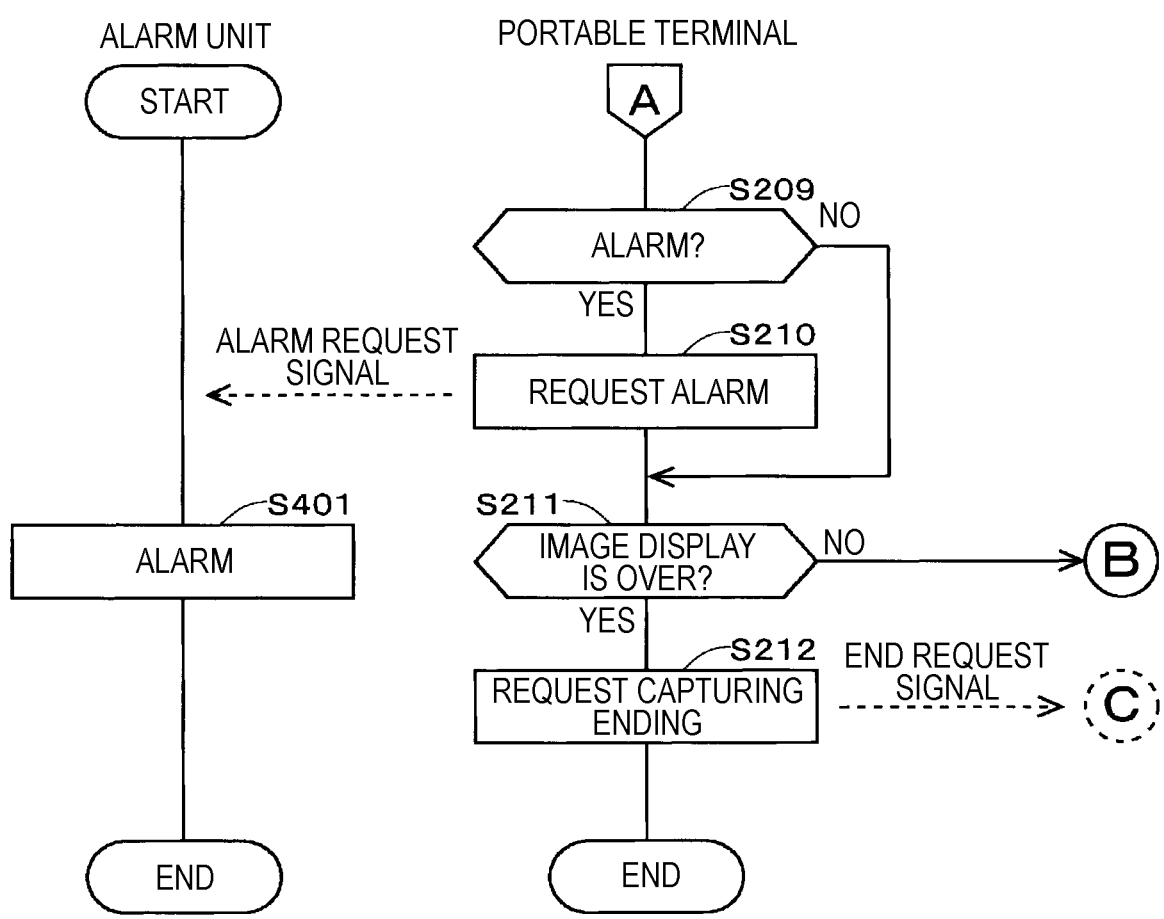
FIG. 26 is a flow chart depicting a processing sequence that is to be executed by the image display system of FIG. 1.

In the below, a processing sequence that is to be executed in the image display system 1 is described with reference to FIGS. 25 and 26. FIG. 25 depicts a processing sequence that is to be executed by the image acquisition device 3, the security device 5 and the portable terminal 8. FIG. 26 depicts a processing sequence that is to be executed by the alarm unit 6 and the portable terminal 8. This processing is repeatedly executed with a predetermined period.

First, the security device 5 determines whether the monitoring sensor 5a has operated (step S101 in FIG. 25).

When it is determined that the monitoring sensor 5a has operated (Yes in step S101), the security device 5 controls the mail notification unit 5b to transmit an electronic mail, which indicates that the monitoring sensor 5a has operated, i.e., the previous phenomenon leading to the theft has occurred in the vehicle 2, to the portable terminal 8 of the user (step S102). As an example where the monitoring sensor 5a has operated, a case where the monitoring sensor 5a detects occurrence of vibrations or inclination in the vehicle 2, breaking of the glass, an invader into the vehicle 2 or the like may be cited.

When the security device 5 determines that the monitoring sensor 5a has not operated (No in step S101) or when the mail notification unit 5b transmits the electronic mail, the processing by the security device 5 is over. The security device 5 resumes the processing after predetermined time.

When the communication unit 82 of the portable terminal 8 receives the electronic mail transmitted from the mail notification unit 5b, the display control unit 81c displays the contents of the electronic mail on the display 83 (step S201). The user checks the contents of the electronic mail displayed on the display, and determines whether or not to display the surrounding image of the vehicle 2. When the user wants the display of the surrounding image of the vehicle 2, the user may touch a predetermined position on the touch panel 83a.

The operation detection unit 81d determines whether the user has touched the predetermined position on the touch panel 83a, at which the surrounding image is to be displayed (step S202).

When the operation detection unit 81d determines that the user wants the display of the image because the user has touched the predetermined position on the touch panel 83a, at which the surrounding image is to be displayed (Yes in step S202), the notification unit 81e transmits to the image acquisition device 3 a signal for requesting transmission of the image (step S203).

When the operation detection unit 81d determines that the user has touched a predetermined position on the touch panel 83a, which indicates that the surrounding image is not to be displayed, i.e., the user does not want the display of the image (No in step S202), the processing is over. The reason is that it is not necessary to continue the processing since the user does not want the display of the image.

When the request reception unit 31a of the image acquisition device 3 receives from the portable terminal 8 the signal for requesting transmission of the image, the camera control unit 31b controls the cameras 4 (4F, 4B, 4L, 4R) to start the capturing (step S301).

When the image acquisition unit 31c receives the image data corresponding to the images captured by the cameras 4 (4F, 4B, 4L, 4R), the image transmission unit 31d transmits the image data to the portable terminal 8 through the communication unit 32 (step S302).

When the image acquisition unit 81a of the portable terminal 8 receives the image data transmitted from the image acquisition device 3, the image generation unit 81b sets the position and direction of the virtual perspective for generating the surrounding image (step S204). When generating the surrounding image for the first time, the image generation unit 81b sets the position of the virtual perspective immediately above the vehicle 2 and sets the direction of the virtual field of view in the downward direction (top view). The virtual perspective is a perspective at which the user looks down the vehicle 2 from a position immediately above the vehicle 2. The corresponding perspective is preferable as the position and direction of the virtual perspective that is first to be presented to the user. That is, since the entire surroundings of the vehicle are displayed, it is possible to extensively present the user with the situations.

After setting the virtual perspective, the image generation unit 81b generates the surrounding image by the above-described methods. Then, the image generation unit 81b reads out the vehicle body image data 84a from the storage unit 84, and generates a synthesized image by synthesizing the vehicle body image into the generated surrounding image (step S205).

When the image generation unit 81b generates the synthesized image, the display control unit 81c displays the synthesized image on the display 83 (step S206). Thereby, the user can check the surrounding situations of the vehicle 2.

When the display control unit 81c displays the synthesized image on the display 83, the operation detection unit 81d determines whether the user has performed the flick operation on the display 83 (step S207).

When the operation detection unit 81d determines that the user has performed the flick operation (Yes in step S207), the image generation unit 81b again sets the virtual perspective (step S204).

When the user has performed the flick operation in the left-right direction (horizontal direction) on the display 83, the image generation unit 81b rotates the virtual perspective on the basis of the vertical direction axis of the world coordinate system to set the position of the virtual perspective, as described above.

When the flick operation is performed from the right towards the left on the display 83, the image generation unit 81b rotates the position of the virtual perspective in the counterclockwise direction, when seeing the vertical direction axis of the world coordinate system from above. Also, when the flick operation is performed from the left towards the right on the display 83, the image generation unit 81b rotates the position of the virtual perspective in the clockwise direction, when seeing the vertical direction axis of the world coordinate system from above.

When the user has performed the flick operation in the upper-lower direction (vertical direction) on the display 83, the image generation unit 81b rotates the virtual perspective on the basis of the horizontal direction axis of the perspective coordinate system to set the position of the virtual perspective, as described above.

When the flick operation is performed from the upper towards the lower on the display 83, the image generation unit 81b rotates the position of the virtual perspective in the counterclockwise direction, when seeing the horizontal direction axis of the perspective coordinate system from the right of the perspective. Also, when the flick operation is performed from the lower towards the upper on the display 83, the image generation unit 81b rotates the position of the virtual perspective in the clockwise direction, when seeing the horizontal direction axis of the perspective coordinate system from the right of the perspective.

By rotating the position of the virtual perspective in this way, the direction in which the user wants to move the perspective by the flick operation and the moving direction of the image to be displayed coincide with each other and the user can intuitively move the image through the operation on the touch panel 83a.

When the operation detection unit 81d determines that the user has not performed the flick operation (No in step S207), the operation detection unit 81d determines whether an operation of changing the virtual perspective to the reference perspective has been performed (step S208). The operation detection unit 81d determines whether the user has touched any one touch panel button indicative of the reference perspective.

When the operation detection unit 81d determines that an operation of changing the virtual perspective to the reference perspective has been performed (Yes in step S208), the image generation unit 81b sets the position and direction of the virtual perspective to the reference perspective designated by the user's touch operation (step S204). For example, when the user desires a reference perspective for displaying the left area of the vehicle 2, the image generation unit 81b sets the position and direction of the virtual perspective as shown in FIGS. 9 and 10. In the meantime, the reference perspective includes five perspectives of the immediately above of the vehicle, the left of the vehicle 2, the right of the vehicle 2, the front of the vehicle 2 and the rear of the vehicle 2. The position of the movement center point RC, which is a specific point set at the specific position of the vehicle, is set to a position corresponding to the user's desired reference perspective.

On the other hand, when the operation detection unit 81d determines that an operation of changing the virtual perspective to the reference perspective has not been performed (No in step S208), the operation detection unit 81d determines whether the user intends to operate the alarm unit 6 mounted to the vehicle 2 (step S209). The operation detection unit 81d determines whether the user has touched a predetermined position on the touch panel 83a, which indicates an operation of the alarm unit.

When the operation detection unit 81d determines that the user intends to operate the alarm unit 6 (Yes in step S209), the notification unit 81e transmits a signal for requesting an operation of the alarm unit 6 to the image acquisition device 3 (step S210).

When the notification unit 81e transmits a signal for requesting an operation of the alarm unit 6, the antitheft unit 31e of the image acquisition device 3 enables the alarm unit 6 to issue a warning (step S401). In the meantime, the warning by the alarm unit 6 is over after predetermined time elapses. The predetermined time may be a time period enough to warn a suspicious person. For example, the predetermined time is 5 seconds. The user may also end the warning.

When the operation detection unit 81d determines that the user does not intend to operate the alarm unit 6 (No in step S209), or when the antitheft unit 31e enables the alarm unit 6 to issue the warning (step S210), the operation detection unit 81d determines whether the user intends to end the image display (step S211).

When the operation detection unit 81d determines that the user intends to end the image display (Yes in step S211), the notification unit 81e transmits a signal for requesting capturing ending to the image acquisition device 3 (step S212). When the notification unit 81e transmits a signal for requesting the capturing ending to the image acquisition device 3, the processing by the portable terminal 8 is over.

When the operation detection unit 81d determines that the user does not intend to end the image display (No in step S211), the display control unit 81c continues to generate and display the image, and the portable terminal 8 again executes the processing of step S205 and thereafter.

When the image transmission unit 31d transmits the image data in step S302, the request reception unit 31a determines whether the ending request signal for requesting the capturing ending has been transmitted from the portable terminal 8 (step S303). The image acquisition device 3 repeatedly transmits the image data most recently obtained by the cameras 4(4F, 4B, 4L, 4R) to the portable terminal 8 until the ending request signal is received. Thereby, the image generation unit 81b of the portable terminal 8 can generate the surrounding image indicative of the surrounding situations of the vehicle 2 in substantially real time on the basis of the most recently obtained image data.

When the request reception unit 31*a* determines that the ending request signal for requesting the capturing ending has been transmitted from the portable terminal 8 (Yes in step S303), the camera control unit 31*b* controls the cameras 4 (4F, 4B, 4L, 4R) to stop the capturing (step S304). When the camera control unit 31*b* controls the cameras 4 (4F, 4B, 4L, 4R) to stop the capturing, the processing by the image acquisition device 3 is over.

As described above, according to the image display system 1 of the first illustrative embodiment, the position of the virtual perspective is changed and the synthesized image is displayed, based on the user's operation. Thereby, it is possible to easily display the imaging subject from the user's desired perspective.

2. Second Illustrative Embodiment

2-1. Outline

In the below, a second illustrative embodiment is described. In the first illustrative embodiment, when the perspective position VL is located immediately above the vehicle 2 and the line of sight VD faces towards the downward direction (−Z side) (i.e., the top view), the movement of the perspective position VL, in response to the user's flick operation in the left-right direction (horizontal direction), is based on the vertical axis (Z axis) of the Cartesian coordinate system cc. Thereby, the synthesized image CP is displayed with being rotated leftward or rightward.

However, even when the synthesized image CP is displayed with being rotated, the corresponding display does not present the user with a new surrounding area.

In the second illustrative embodiment, the movement of the perspective position VL in the top view is based on the Y axis of the Cartesian coordinate system cc, which is the longitudinal axis of the vehicle 2. Thereby, in the top view, when the user performs the flick operation in the left-right direction (horizontal direction) on the touch panel 83*a*, the left and right areas of the vehicle 2 including the sides of the vehicle 2 are displayed. For this reason, the user can check the left and right areas of the vehicle 2 in detail.

In the below, the differences from the first illustrative embodiment are mainly described, and the overlapping descriptions as to the same or similar configurations and operations as or to the first illustrative embodiment are omitted.

2-2. Configuration

Figure 27:
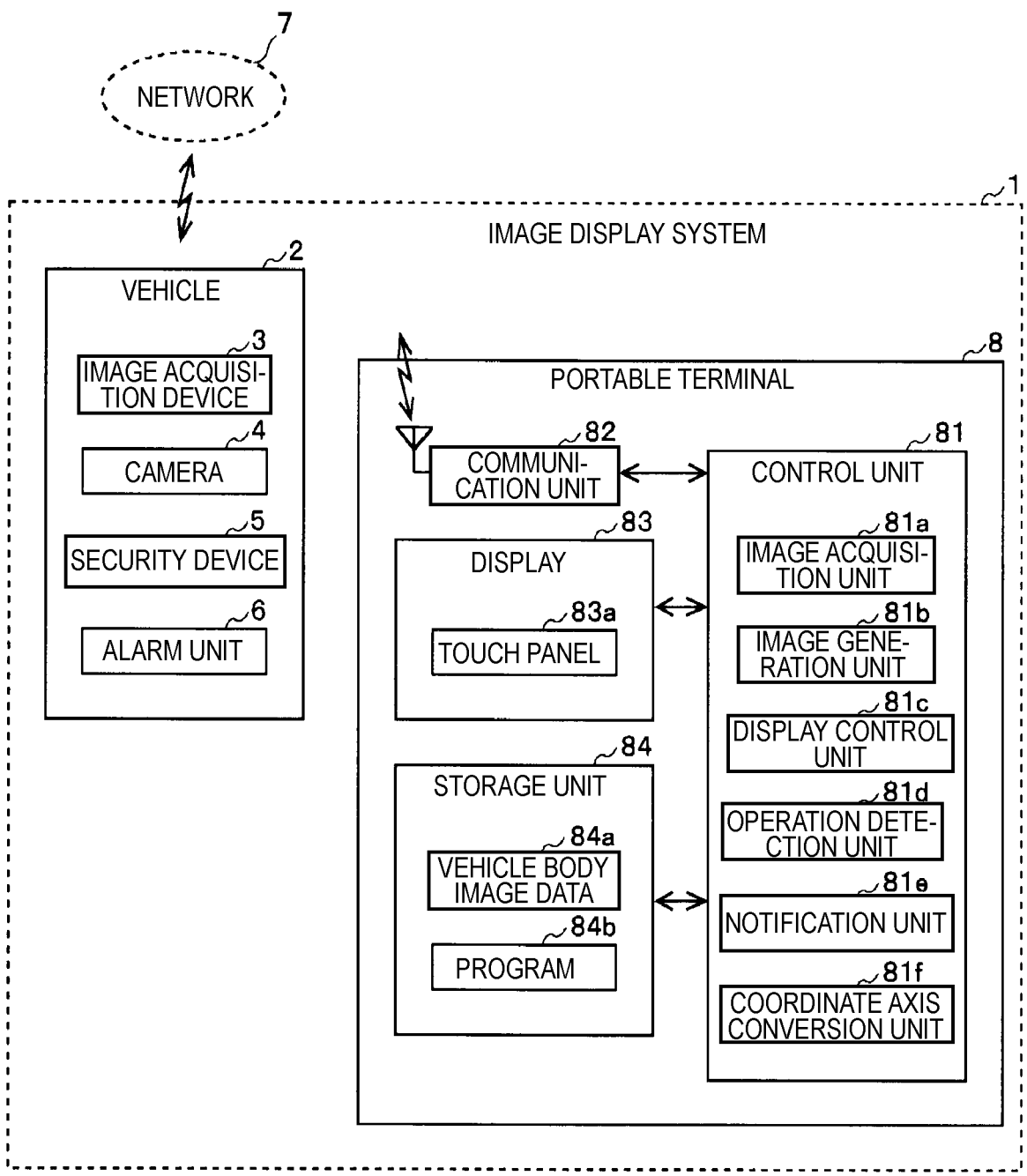
FIG. 27 is a block diagram depicting a configuration of the portable terminal of the image display system according to a second illustrative embodiment.

FIG. 27 depicts a configuration of the portable terminal 8 of the image display system 1 according to the second illustrative embodiment. The main difference from the first illustrative embodiment is that the control unit 81 of the portable terminal 8 has a coordinate axis conversion unit 81*f*.

The coordinate axis conversion unit 81*f* converts the coordinate axis becoming a movement reference of the perspective position VL from the vertical axis (Z axis) of the Cartesian coordinate system cc to the longitudinal axis (Y axis) of the vehicle when the virtual perspective is a top view.

2-3. Setting of Virtual Perspective

In the below, a method of moving the perspective position VL in the left-right direction (horizontal direction) while the user sees the display in the top view display is described with reference to FIGS. 28 and 29. The movement of the perspective position VL to be described below is performed in correspondence to the user's flick operation in the left-right direction (horizontal direction) on the touch panel, in the top view display.

FIG. 28 depicts the vehicle 2, as viewed from the vertically upper direction (+Z side), and also illustrates a moving path of the reference position VLt of the reference virtual perspective VPat. The reference position VLt moves along the movement path OBth having the movement center point RCt as a center. The movement of the reference position VLt is based on the Cartesian coordinate system cc that is relatively fixed to the virtual perspective VP having the position of the movement center point RCt as an origin. The coordinate axis becoming a movement reference of the reference position VLt is the Y axis (AXth) of the Cartesian coordinate system cc at the position of the movement center point RCt, i.e., the longitudinal axis of the vehicle 2.

Figure 29:
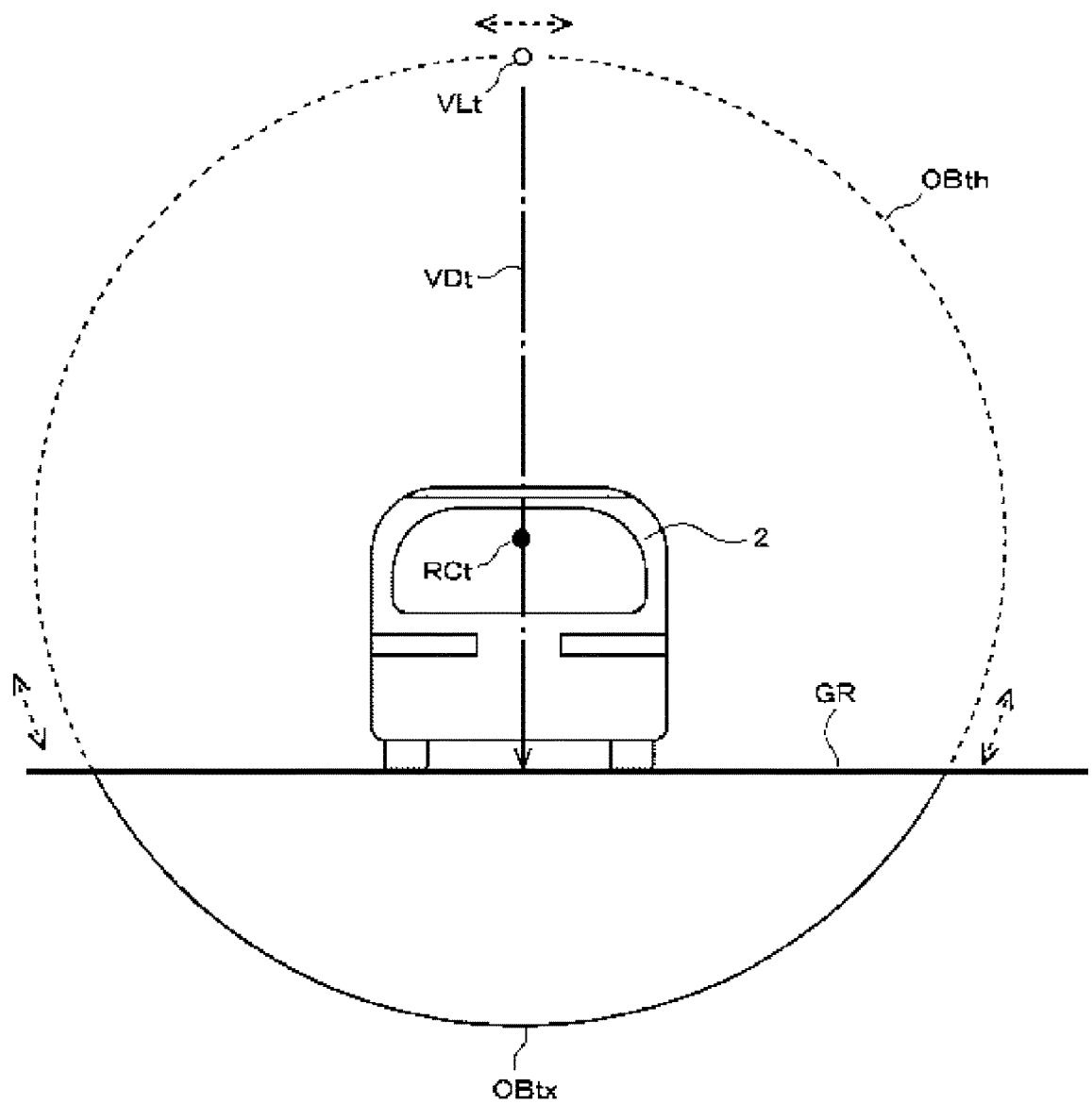
FIG. 29 depicts movement of the virtual perspective in the image display system of FIG. 27.

FIG. 29 depicts the vehicle 2, as viewed from the rear (−Y side) in the horizontal direction, and also illustrates the moving path of the reference position VLt of the reference virtual perspective VPat, like FIG. 28. The reference position VLt moves along the movement path OBth having the movement center point RCt as a center. The movement path OBth is a circle, as seen from the rear (−Y side) in the horizontal direction. The coordinate axis becoming a movement reference of the reference position VLt is the Y axis of the Cartesian coordinate system cc at the position of the movement center point RCt.

In FIGS. 28 and 29, the reference direction VDt always faces a direction from the reference position VLt towards the movement center point RCt, even when the reference position VLt is located at any position on the movement path OBth. Therefore, when the reference position VLt moves along the movement path OBth, the user seeing the display 83 feels as if the image moves in the left-right direction (horizontal direction). In particular, since the coordinate axis becoming the movement reference of the reference position VLt is set to the Y axis of the Cartesian coordinate system cc at the position of the movement center point RCt, the user can refer to the surrounding image of the vehicle 2 as if the image went round the lateral sides of the vehicle 2.

In the meantime, the movement path OBth is not set below the ground contact surface GR of the vehicle 2. Therefore, the reference position VLt moves along the movement path OBth shown with the broken line and does not move along a movement path OBtx shown with the solid line.

When the user performs the flick operation from the left direction towards the right direction (in the horizontal direction) on the touch panel 83*a*, the reference position VLt moves in the counterclockwise direction along the movement path OBth. On the other hand, when the user performs the flick operation from the right direction towards the left direction (in the horizontal direction) on the touch panel 83*a*, the reference position VLt moves in the clockwise direction along the movement path OBth. Thereby, since the direction of the user's flick operation and the moving direction of the image coincide with each other, the user can intuitively perform the touch panel operation.

2-4. Display Examples of Synthesized Image

An upper figure of FIG. 13 depicts an example where the synthesized image CPt1 is displayed on the display 83. The synthesized image CPt1 is an image where the vehicle 2 is viewed from the reference virtual perspective VPat set as the virtual perspective VP. That is, the synthesized image CPt1 is a synthesized image when the virtual perspective is a top view.

A lower figure of FIG. 30 depicts an example where a synthesized image CPt4 is displayed on the display 83. The synthesized image CPt4 is an image displayed when the coordinate axis for moving the perspective position VL is converted from the vertical axis (Z axis) of the Cartesian coordinate system cc to the longitudinal axis (Y axis) of the vehicle after the display of the synthesized image CPt1, i.e., an image where the vehicle 2 is viewed from the reference virtual perspective VPat set by moving the reference position in the counterclockwise direction along the movement path OBth of FIG. 29. The synthesized image CPt4 displays the vehicle body image 10, in addition to the surrounding image of the vehicle 2 including the lateral side of the vehicle 2. For this reason, the user can check in detail the left and right areas of the vehicle 2 from the top view. The synthesized image CPt4 is displayed when the flick operation FH is performed from the left direction towards the right direction (in the horizontal direction) on the touch panel 83a with the synthesized image CPt1 being displayed. The user can check in detail the left and right areas of the vehicle 2 including the lateral sides of the vehicle 2 by referring to the synthesized image CPt4.

2-5. Processing

Figure 31:
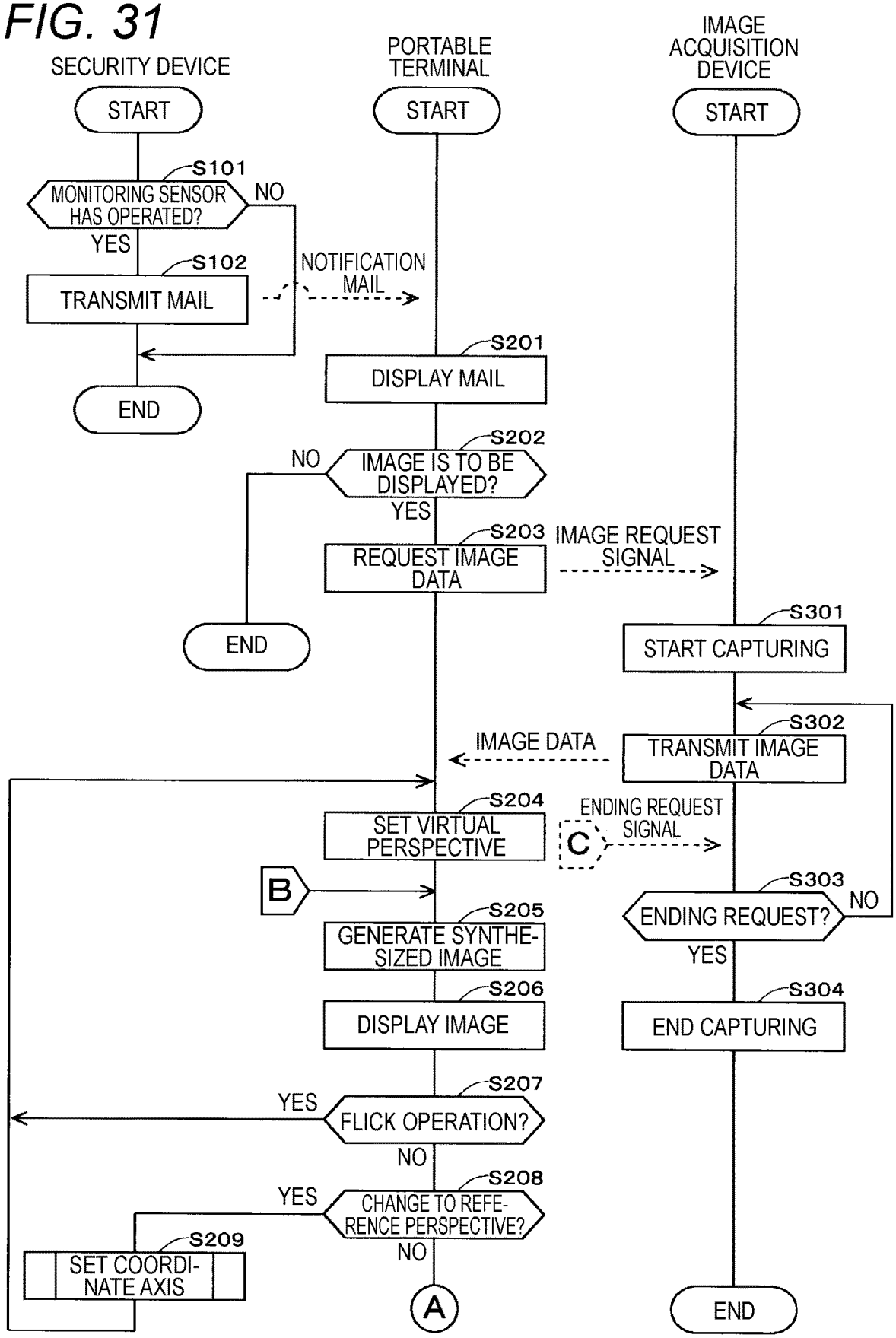
FIG. 31 is a flow chart depicting a processing sequence that is to be executed by the image display system of FIG. 27.

In the below, a processing sequence that is to be executed in the image display system 1 of the second illustrative embodiment is described with reference to FIGS. 31 and 32. FIG. 31 depicts a processing sequence that is to be executed by the image acquisition device 3, the security device 5 and the portable terminal 8. This processing sequence is different from the processing sequence of the first illustrative embodiment shown in FIG. 25, in that processing of step S209 is included.

First, the image generation unit 81b sets the position of the virtual perspective and the direction of the virtual field of view for generating the surrounding image (step S204). When generating the surrounding image for the first time, the image generation unit 81b sets the position of the virtual perspective immediately above the vehicle 2 and sets the direction of the virtual field of view in the downward direction (top view). Also, the coordinate axis conversion unit 81f sets the longitudinal axis (Y axis) of the vehicle as the axis becoming the movement reference of the perspective position VL.

When the processing of step S205, step S206 and step S207 is executed, the operation detection unit 81d determines whether an operation of changing the virtual perspective to the reference perspective has been performed (step S208). The operation detection unit 81d determines whether the user has touched any one touch panel button indicative of the reference perspective.

When the operation detection unit 81d determines that an operation of changing the virtual perspective to the reference perspective has been performed (Yes in step S208), the image generation unit 81b executes coordinate axis setting processing (step S209).

Figure 32:
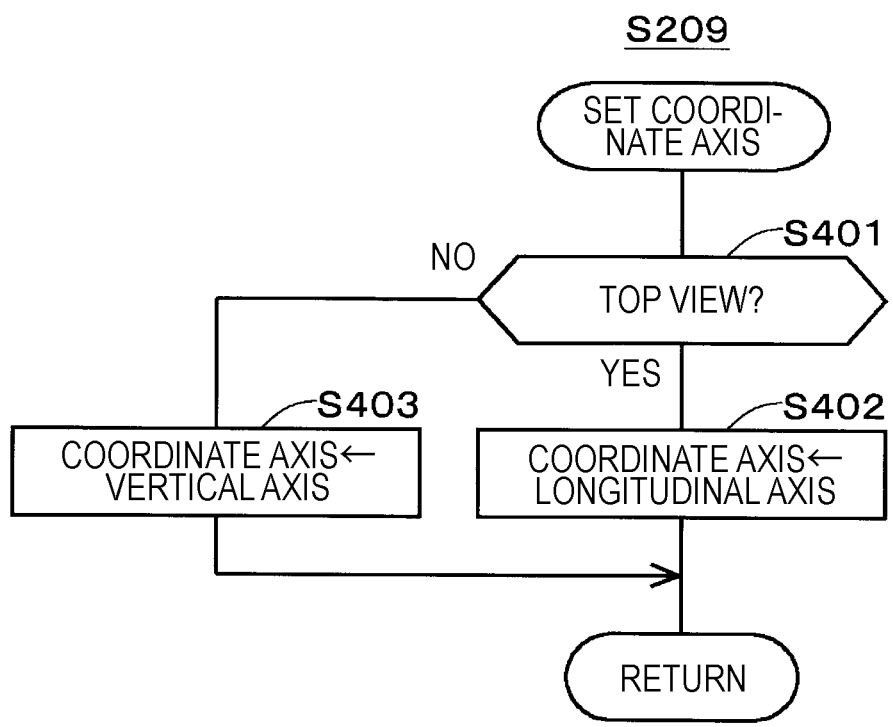
FIG. 32 is a flow chart depicting a processing sequence that is to be executed by the image display system of FIG. 27.

FIG. 32 depicts the coordinate axis setting processing in detail. When the processing proceeds to the coordinate axis setting processing (step S209), the operation detection unit 81d determines whether the virtual perspective has been changed to the perspective of a top view (step S401).

When the operation detection unit 81d determines that the virtual perspective has been changed to the perspective of a top view (Yes in step S401), the coordinate axis conversion unit 81f sets the longitudinal axis (Y axis) of the vehicle as the coordinate axis becoming the movement reference of the perspective position VL (step S402).

When the operation detection unit 81d determines that the virtual perspective has been changed to a perspective rather than the perspective of a top view (No in step S401), the coordinate axis conversion unit 81f sets the vertical axis (Z axis) as the coordinate axis becoming the movement reference of the perspective position VL (step S403).

When the processing of step S402 or step S403 is executed, the processing returns to FIG. 31 and the processing of step S204 and thereafter is again executed.

As described above, according to the image display system 1 of the second illustrative embodiment, in the top view, the movement of the perspective position VL is made on the basis of the axis (Y axis) of the Cartesian coordinate system cc, which is the longitudinal axis of the vehicle 2. Thereby, in the top view, when the user performs the flick operation in the left-right direction (horizontal direction) on the touch panel 83a, the left and right areas of the vehicle 2 including the sides of the vehicle 2 are displayed. For this reason, the user can check in detail the left and right areas of the vehicle 2.

3. Modified Embodiments

The present invention is not limited to the above illustrative embodiments, and a variety of changes can be made. In the below, the modified embodiments are described. In the meantime, the above illustrative embodiments and the modified embodiments can be appropriately combined.

In the respective illustrative embodiments, the image acquisition device 3 is configured to start the capturing upon the reception of the request for image transmission from the user. However, the image acquisition device 3 may be configured to start the capturing before the request for image transmission is received from the user, i.e., upon the operation of the monitoring sensor 5a. In this case, the user can refer to the surrounding situations of the vehicle 2 from when an abnormality, which causes the monitoring sensor 5a to operate, occurs in the vehicle.

Figure 33:
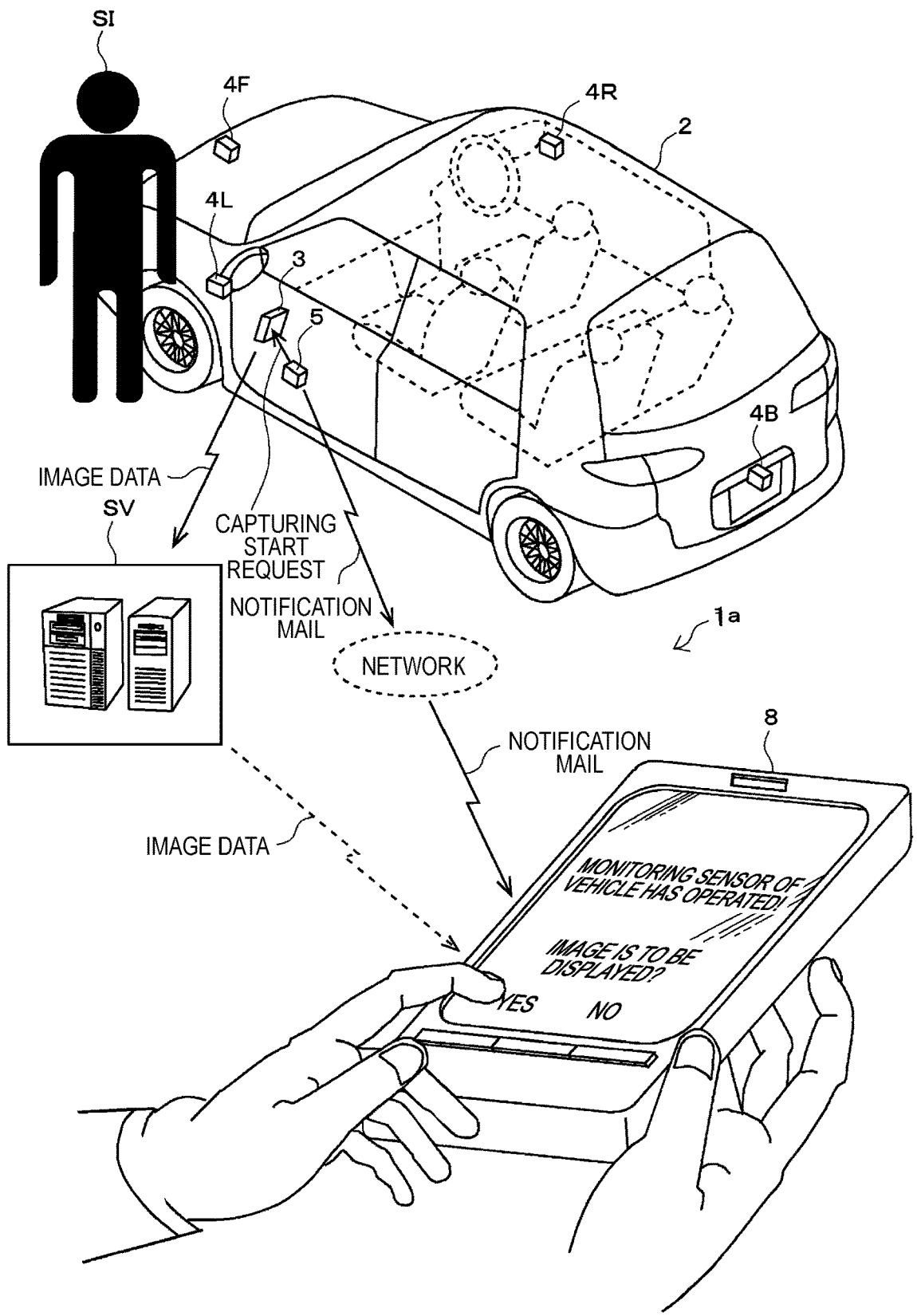
FIG. 33 depicts a modified embodiment of the image display system.

FIG. 33 depicts an outline of an image display system 1a in which the image acquisition device 3 is configured to start the capturing upon the operation of the monitoring sensor 5a. When the monitoring sensor 5a detects an abnormality of the vehicle 2, the security device 5 transmits to the image acquisition device 3 a signal for requesting the capturing start. When the image acquisition device 3 receives the signal, the image acquisition device 3 operates the cameras 4 to start the capturing. That is, the image acquisition device 3 starts the capturing upon the occurrence of the abnormality in the vehicle 2 without waiting for the request for image transmission from the user. When the image acquisition device 3 starts the capturing, the image acquisition device 3 transmits the image data to an external server SV. Thereby, the image data is preserved in the server SV from when the abnormality has occurred in the vehicle 2. Therefore, when the user receives a mail, which notifies that the abnormality has occurred in the vehicle 2, from the security device 5, the user requests the server SV to transmit the image. When the server SV receives the request for image transmission, the server SV transmits the image data to the portable terminal 8 carried by the user from when the abnormality has occurred in the vehicle 2. Thereby, the user can refer to the surrounding situations of the vehicle 2 from when the monitoring sensor 5a has operated, i.e., the abnormality has occurred in the vehicle 2. Also, when the server SV is configured as a dedicated server for transmitting and receiving the image data, there is no concern that the image data will be intercepted by the other person. That is, it is possible to increase the confidentiality of the image data. In the meantime, when the user wants to check the current surrounding situations of the vehicle 2, the user can request the server SV to transmit the current image data. In this case, the server SV transmits the current image data without transmitting the image data from the occurrence of the abnormality until now.

The other modified embodiments are described. In the respective illustrative embodiments, the image acquisition device 3, the cameras 4, the security device 5 and the alarm unit 6 are mounted on the vehicle 2. However, the corresponding devices may be mounted to lands, houses, buildings or products to be monitored.

In the respective illustrative embodiments, the user performs the input operation on the touch panel. However, the user may perform the input operation through a push button-type switch such as arrow key as long as the user's input operation can be discriminated.

In the respective illustrative embodiments, the image acquisition device 3 and the portable terminal 8 are separate devices. However, the image acquisition device 3 and the portable terminal 8 may be configured as an integrated device.

In the respective illustrative embodiments, the respective functions of the image display system 1 are implemented as the software based on the program. However, the respective functions of the image display system 1 may be configured as electrical hardware circuits.

A Japanese Patent Application No. 2013-214014 filed on Oct. 11, 2013, which configures a part of the application, is herein incorporated.

The invention claimed is:

1. An image display system configured to implement a process to:
   acquire a plurality of images obtained by capturing an imaging subject by using a plurality of cameras, the imaging subject including a surrounding of a vehicle on which the plurality of cameras are disposed;
   synthesize the plurality of images and generate a synthesized image which shows the imaging subject viewed from one of a plurality of reference virtual perspectives which are at different positions with respect to the imaging subject;
   display the synthesized image in a first area on a single screen and display a plurality of buttons in a second area, which is different from the first area, on the single screen, the first area and the second area being provided side-by-side on the single screen, the plurality of buttons each corresponding to a respective one of the plurality of reference virtual perspectives;
   detect a first operation performed in the second area on the single screen, the first operation selecting one of the plurality of buttons;
   in response to detecting the first operation, change, in real-time, an entire area of the synthesized image to show the imaging subject viewed from a selected one of the plurality of reference virtual perspectives corresponding to the selected button;
   detect a second operation performed in the first area on the single screen, the second operation being different from the first operation and being at least one of a flick operation, a pinch-in operation and a pinch-out operation; and
   in response to detecting the second operation, change, in real-time, the entire area of the synthesized image to show the imaging subject viewed from a virtual perspective whose position is changed from the reference virtual perspective in accordance with the second operation.

2. An image display system comprising:
   an image acquisition unit configured to acquire a plurality of images obtained by capturing an imaging subject by using a plurality of cameras, the imaging subject including a surrounding of a vehicle on which the plurality of cameras are disposed; and
   a display control unit configured to synthesize the plurality of images and generate a synthesized image which shows the imaging subject viewed from one of a plurality of reference virtual perspectives which are at different positions with respect to the imaging subject, and display the synthesized image in a first area on a screen and display a plurality of buttons in a second area, which is different from the first area, on the screen,
   wherein the display control unit is configured to implement control of:
      providing the first area and the second area to be side-by-side on the screen, and displaying the plurality of buttons to each correspond to a respective one of the plurality of reference virtual perspectives;
      in response to a first operation performed in the second area on the screen and selecting one of the plurality of buttons, changing, in real-time, an entire area of the synthesized image to show the imaging subject viewed from a selected one of the plurality of reference virtual perspectives corresponding to the selected button; and
      in response to a second operation being different from the first operation, being performed in the first area on the screen and being at least one of a flick operation, a pinch-in operation and a pinch-out operation, changing, in real-time, the entire area of the synthesized image to show the imaging subject viewed from a virtual perspective whose position is changed from the reference virtual perspective in accordance with the second operation.

3. The image display system according to claim 1, which is configured to display, as an initial display before the selection of one of the plurality of reference virtual perspectives in response to the first operation, the synthesized image which shows the imaging subject viewed from one of the plurality of reference virtual perspectives.

4. The image display system according to claim 2, which is configured to display, as an initial display before the selection of one of the plurality of reference virtual perspectives in response to the first operation, the synthesized image which shows the imaging subject viewed from one of the plurality of reference virtual perspectives.

5. The image display system according to claim 1, wherein the second operation moves the virtual perspective from any point on a predetermined path in any direction along the predetermined path, and the second operation determines a timing at which the virtual perspective moves.

6. The image display system according to claim 2, wherein the second operation moves the virtual perspective from any point on a predetermined path in any direction along the predetermined path, and the second operation determines a timing at which the virtual perspective moves.

7. The image display system according to claim 3, wherein the second operation moves the virtual perspective from any point on a predetermined path in any direction along the predetermined path, and the second operation determines a timing at which the virtual perspective moves.

8. The image display system according to claim 4, wherein the second operation moves the virtual perspective from any point on a predetermined path in any direction along the predetermined path, and the second operation determines a timing at which the virtual perspective moves.

* * * * *